(12) United States Patent
Mori

(10) Patent No.: US 9,122,038 B2
(45) Date of Patent: Sep. 1, 2015

(54) IMAGING LENS AND IMAGING APPARATUS

(71) Applicant: FUJIFILM CORPORATION, Tokyo (JP)

(72) Inventor: Masao Mori, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/487,120

(22) Filed: Sep. 16, 2014

(65) Prior Publication Data

US 2015/0002946 A1 Jan. 1, 2015

Related U.S. Application Data

(63) Continuation of application No. PCT/JP2013/001169, filed on Feb. 27, 2013.

(30) Foreign Application Priority Data

Mar. 22, 2012 (JP) .................................. 2012-064938

(51) Int. Cl.
*G02B 9/64* (2006.01)
*G02B 15/14* (2006.01)
(Continued)

(52) U.S. Cl.
CPC ...... *G02B 9/64* (2013.01); *G02B 13/04* (2013.01); *G02B 27/0025* (2013.01); *G02B 3/04* (2013.01); *G02B 5/005* (2013.01); *G02B 7/04* (2013.01); *G02B 9/04* (2013.01); *G02B 13/002* (2013.01); *G02B 13/006* (2013.01);
(Continued)

(58) Field of Classification Search
CPC .... G02B 13/0045; G02B 13/18; G02B 15/14; G02B 9/64; G02B 13/0015; G02B 3/04; G02B 13/002; G02B 9/04; G02B 5/005; G02B 13/006; G02B 15/22; G02B 7/04; G02B 15/167
USPC ......... 359/683, 684, 708, 717, 740, 755, 757, 359/793
See application file for complete search history.

(56) References Cited

U.S. PATENT DOCUMENTS

2009/0190220 A1* 7/2009 Sato .............................. 359/766
2011/0211263 A1* 9/2011 Sato et al. ..................... 359/680

FOREIGN PATENT DOCUMENTS

JP S61-188512 8/1986
JP 2001-330775 11/2001
(Continued)

OTHER PUBLICATIONS

International Search Report—PCT/JP2013/001169—Jun. 25, 2013.

*Primary Examiner* — Evelyn A Lester
(74) *Attorney, Agent, or Firm* — Young & Thompson

(57) ABSTRACT

An imaging lens substantially consisting of a first lens group, a stop, and a second lens group in this order from the object side, the first lens group includes at least a positive lens, a negative meniscus lens with a convex surface toward the object side, a biconcave negative lens, and a cemented lens substantially constituted by two lenses, which are a positive lens and a negative lens, in this order from the object side; the second lens group includes at least a first positive lens with a convex surface toward the image side, a cemented lens substantially constituted by two lenses, which are a positive lens and a negative lens, and a second positive lens with a convex surface toward the image side, in this order from the object side; and a predetermined conditional expression is satisfied.

20 Claims, 25 Drawing Sheets

(51) Int. Cl.
| | |
|---|---|
| *G02B 13/18* | (2006.01) |
| *G02B 27/00* | (2006.01) |
| *G02B 13/04* | (2006.01) |
| G02B 13/00 | (2006.01) |
| G02B 9/04 | (2006.01) |
| G02B 15/22 | (2006.01) |
| G02B 5/00 | (2006.01) |
| G02B 15/167 | (2006.01) |
| G02B 3/04 | (2006.01) |
| G02B 7/04 | (2006.01) |

(52) U.S. Cl.
CPC ........ *G02B 13/0015* (2013.01); *G02B 13/0045* (2013.01); *G02B 13/18* (2013.01); *G02B 15/14* (2013.01); *G02B 15/167* (2013.01); *G02B 15/22* (2013.01)

(56) References Cited

FOREIGN PATENT DOCUMENTS

| | | |
|---|---|---|
| JP | 3331228 | 10/2002 |
| JP | 3352253 | 12/2002 |
| JP | 2003-337283 | 11/2003 |
| JP | 3735909 | 1/2006 |
| JP | 2009-244699 | 10/2009 |
| JP | 2009-276536 | 11/2009 |
| JP | 2011-059726 | 3/2011 |

* cited by examiner

FIG.1
EXAMPLE 1
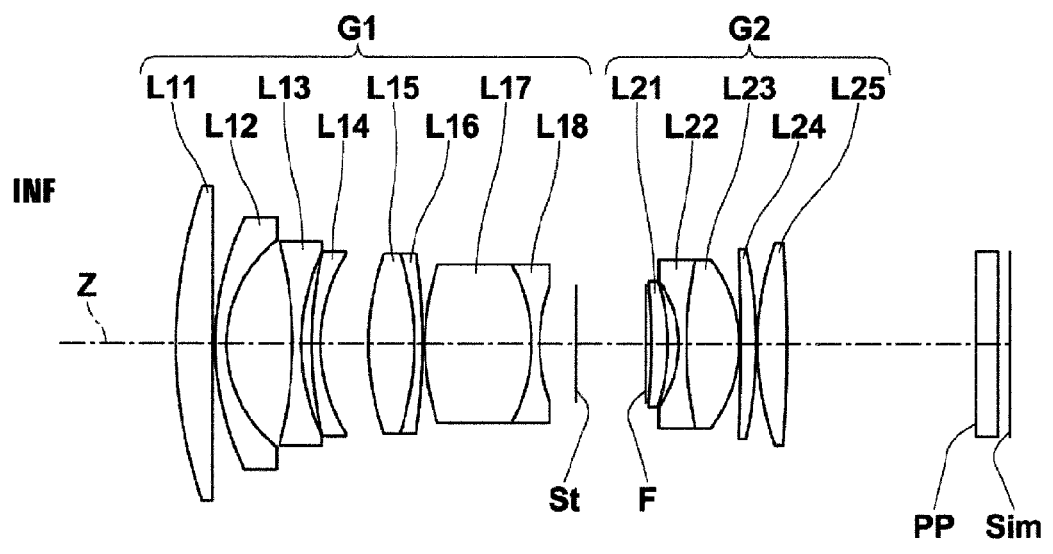
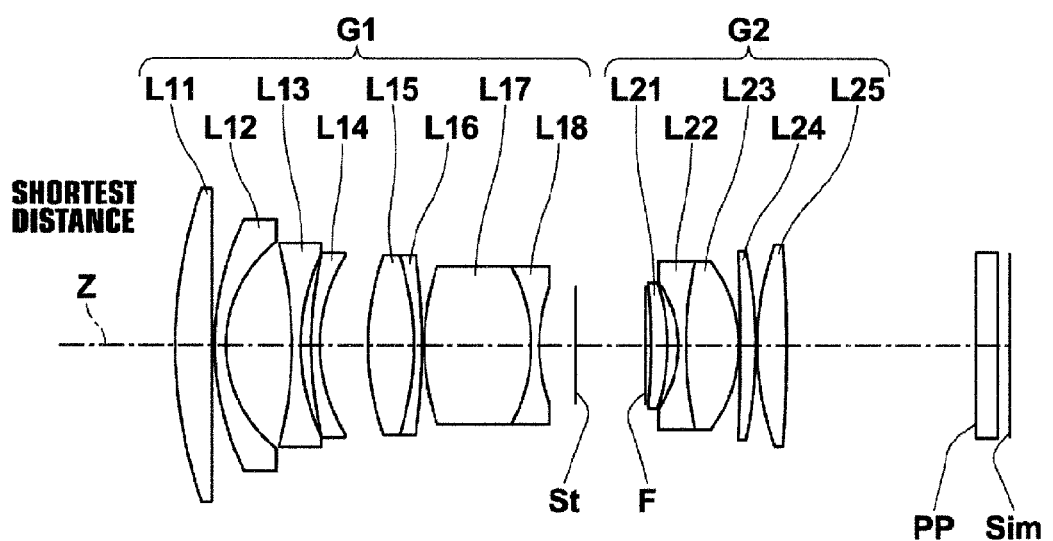

FIG.2  EXAMPLE 2
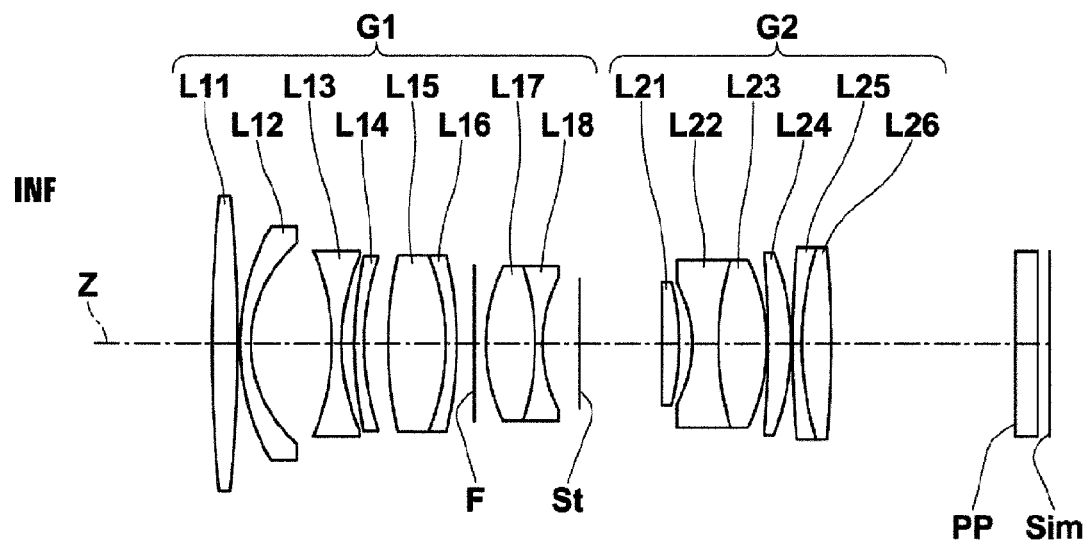
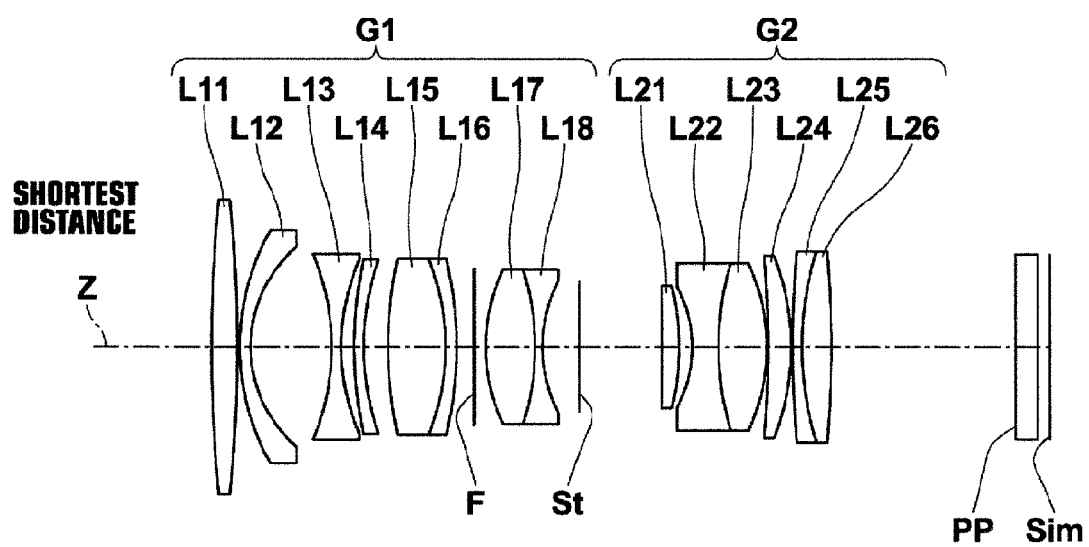

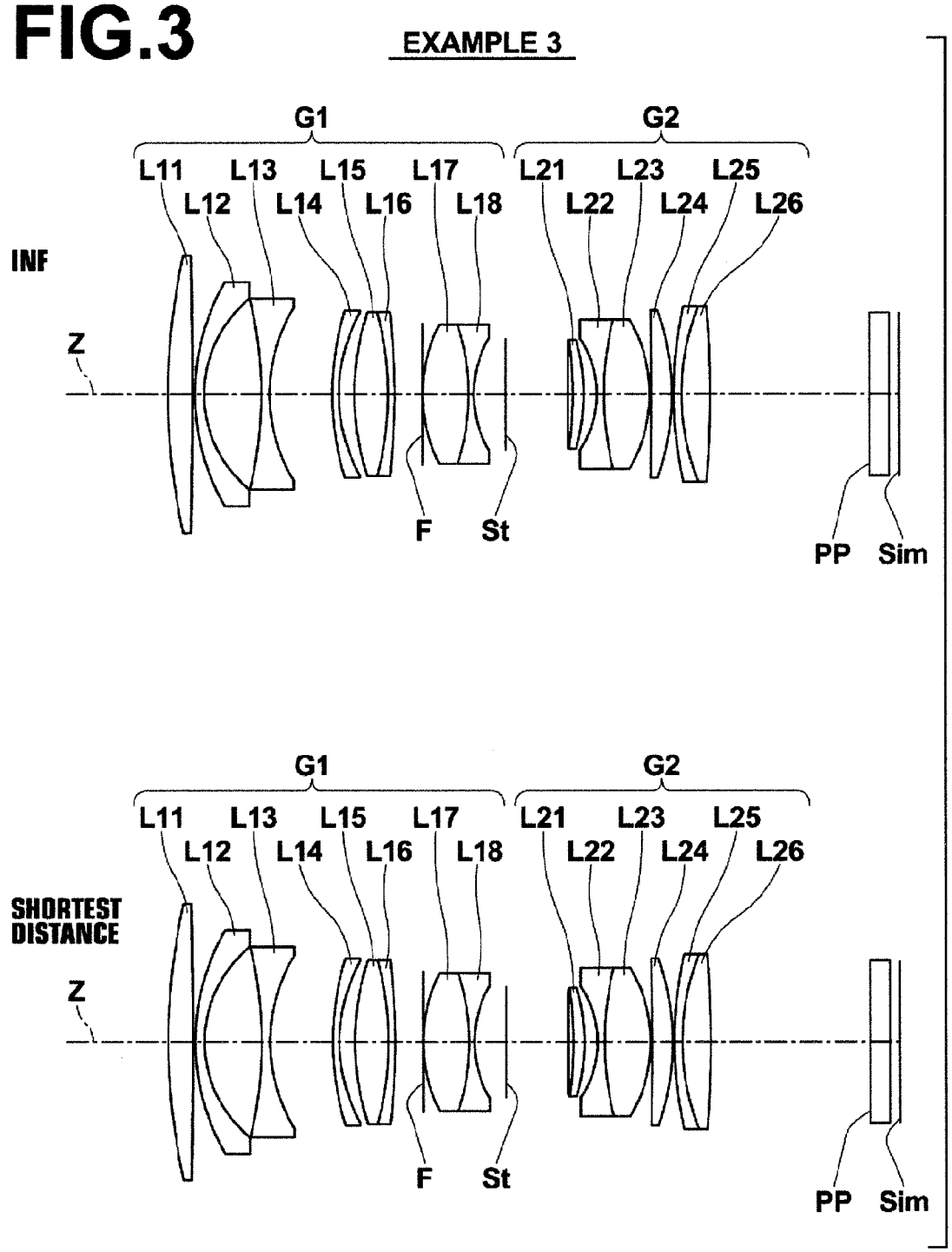

FIG.4
EXAMPLE 4
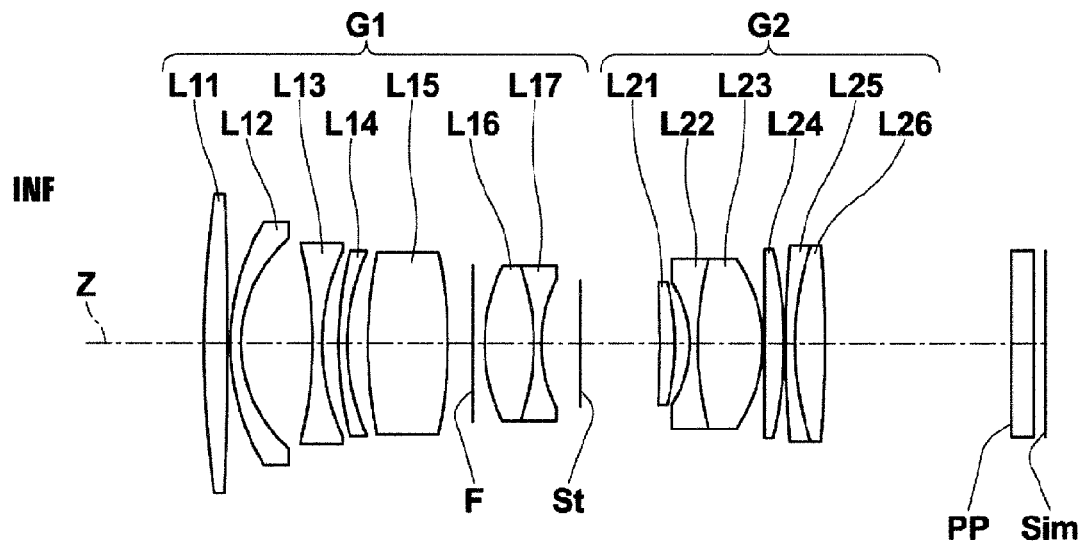
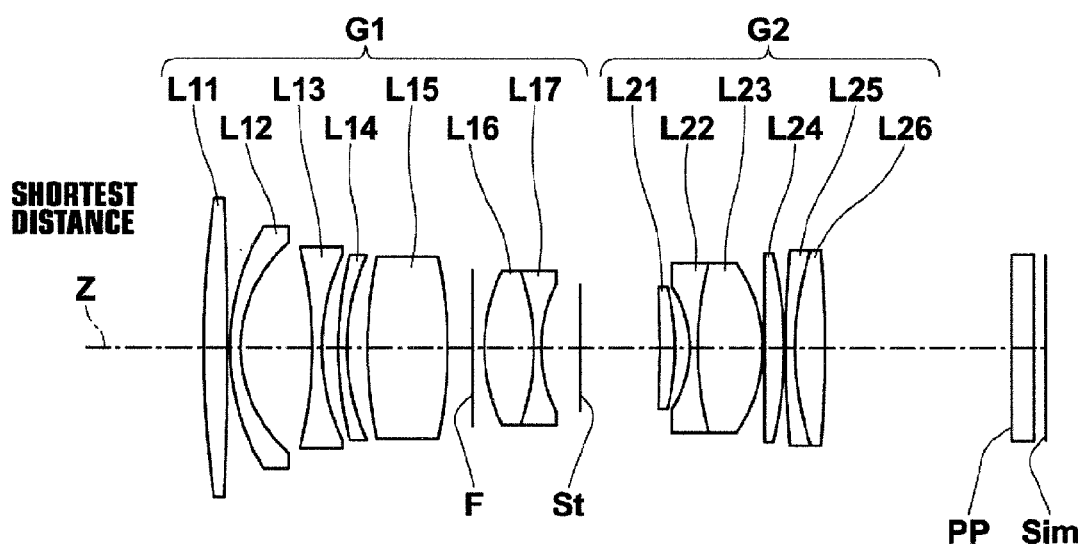

FIG.5   EXAMPLE 5
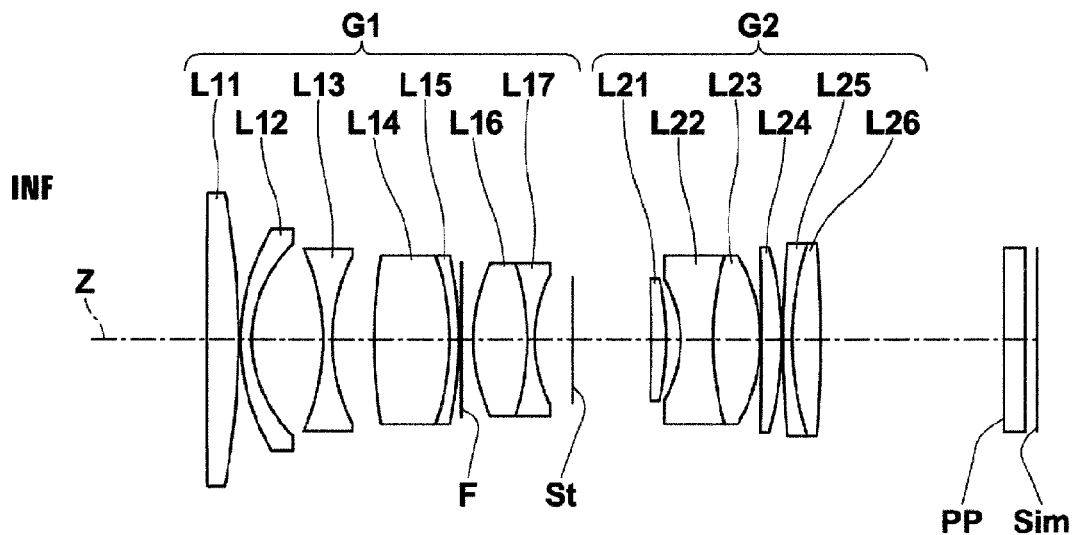
INF
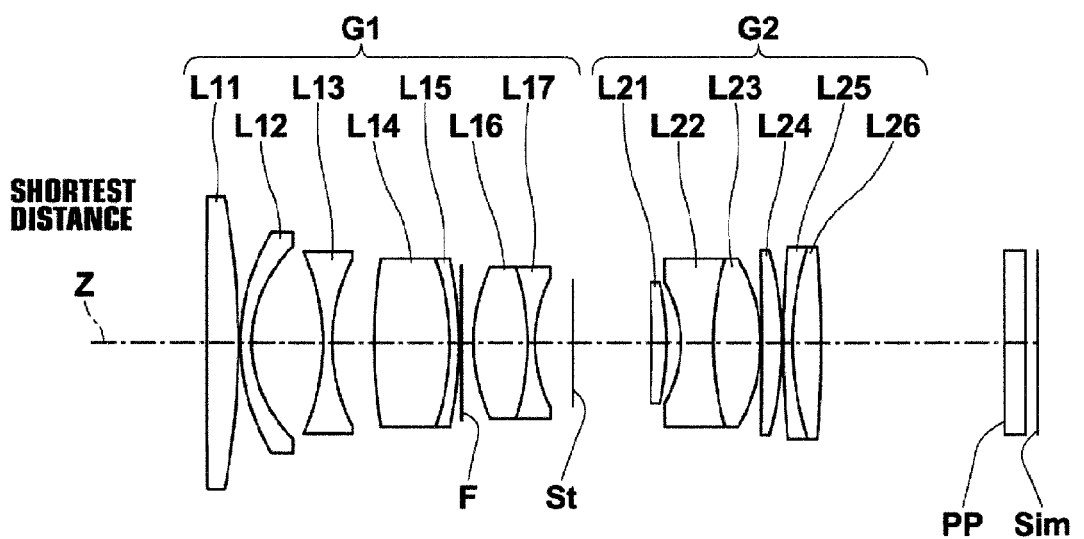
SHORTEST DISTANCE

FIG.6  EXAMPLE 6
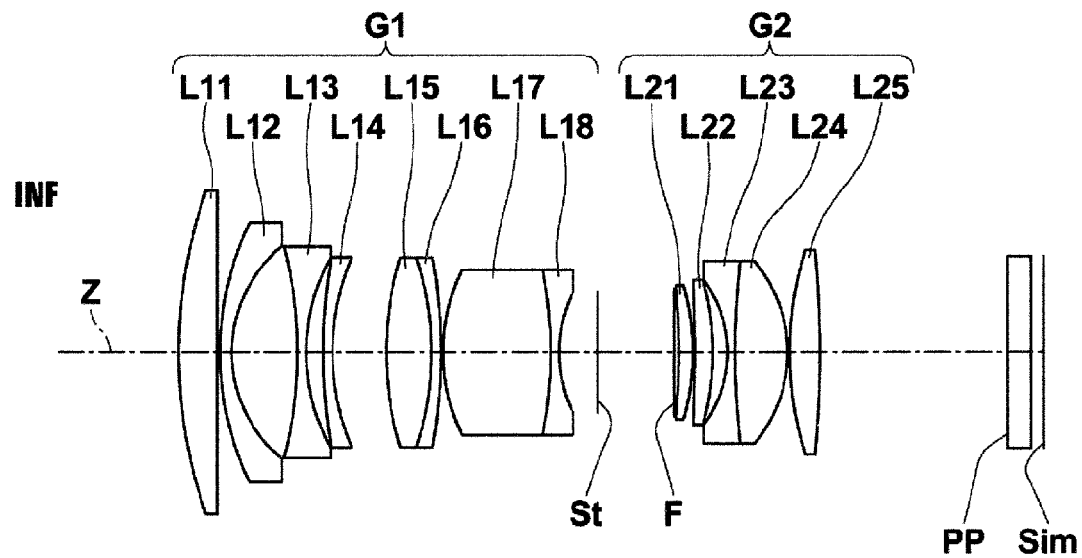
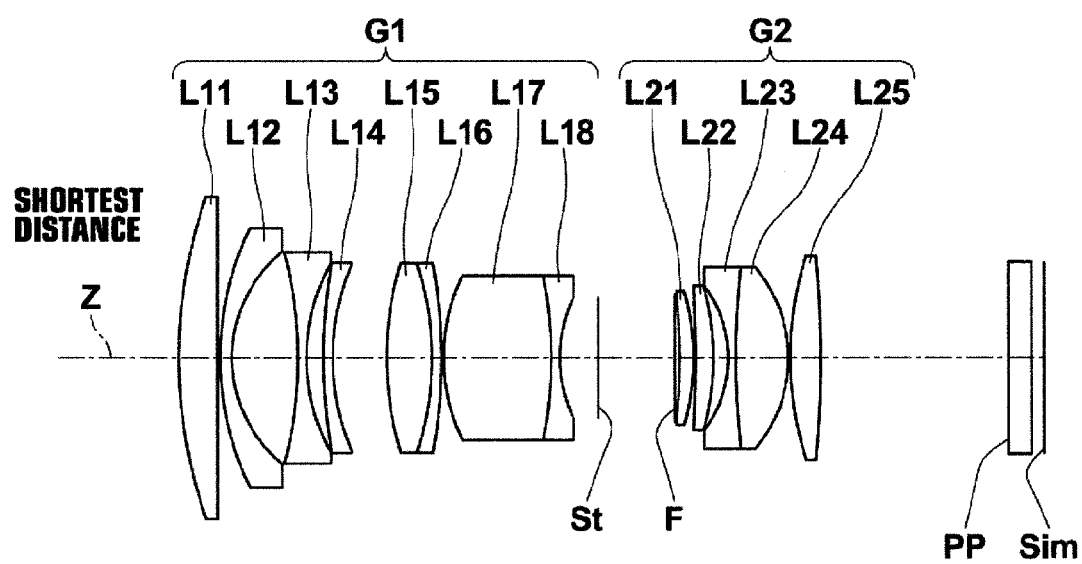

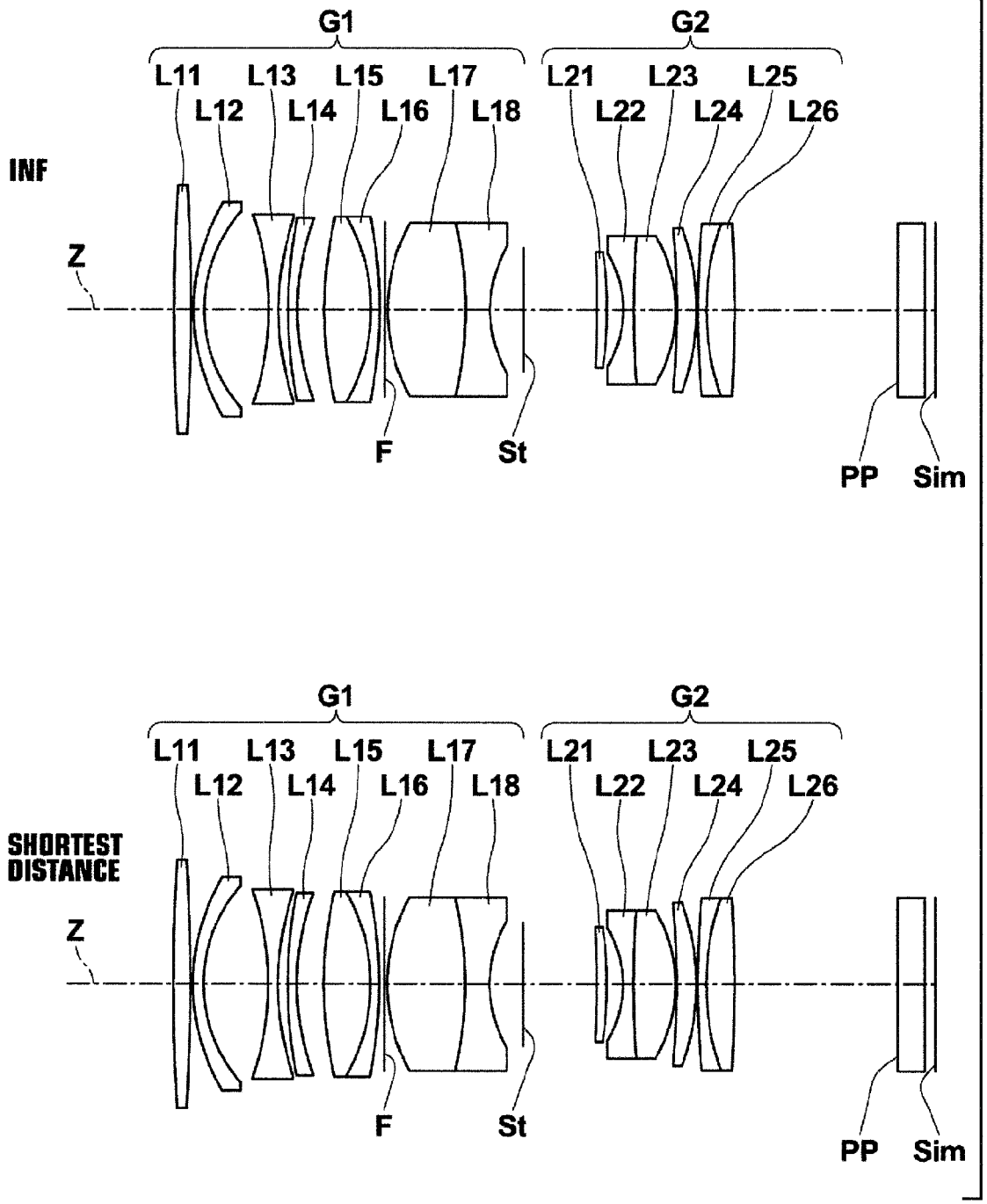

FIG.8
EXAMPLE 8
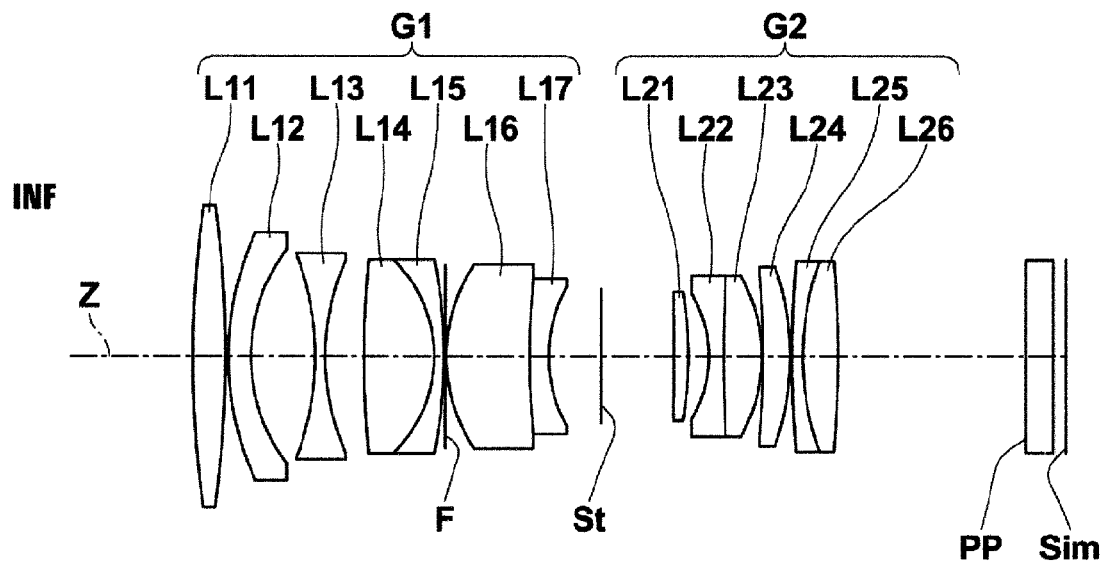
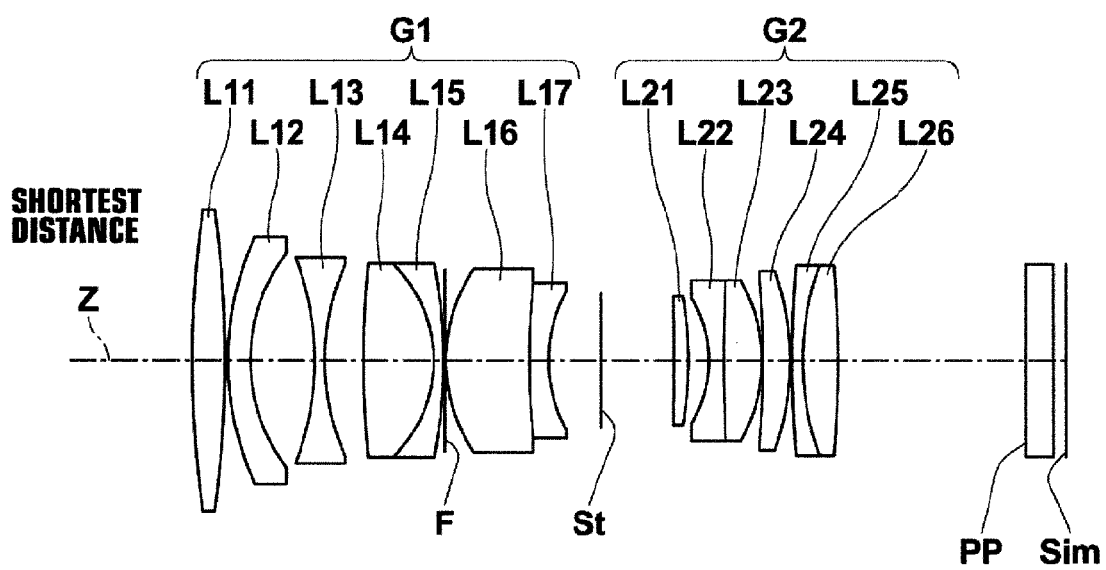

FIG.9
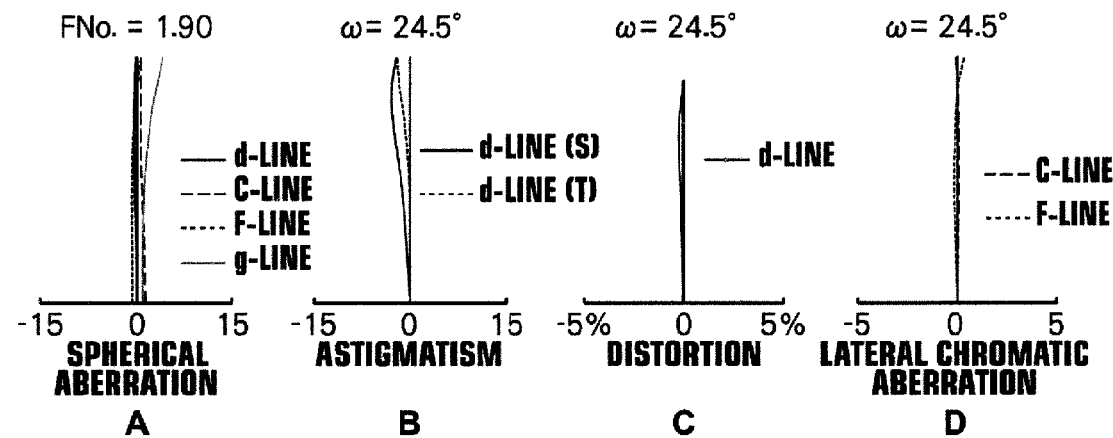
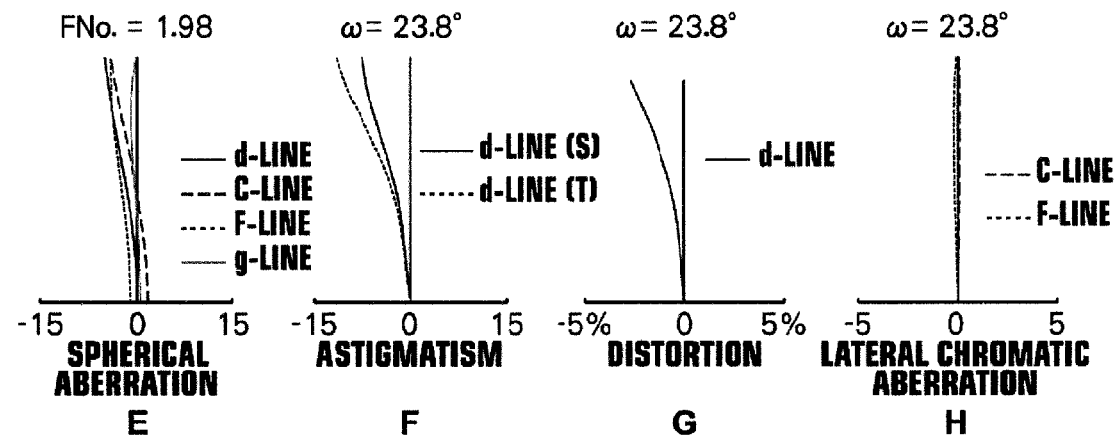

FIG.11
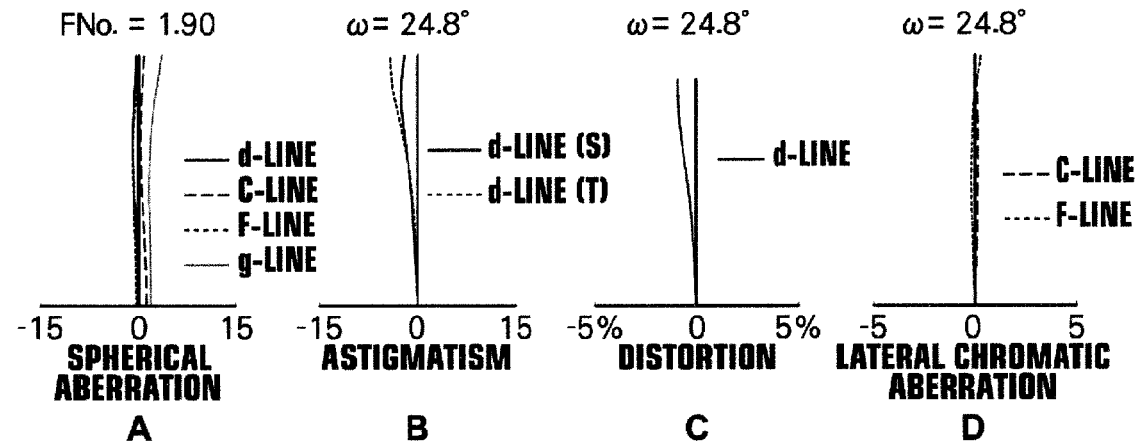
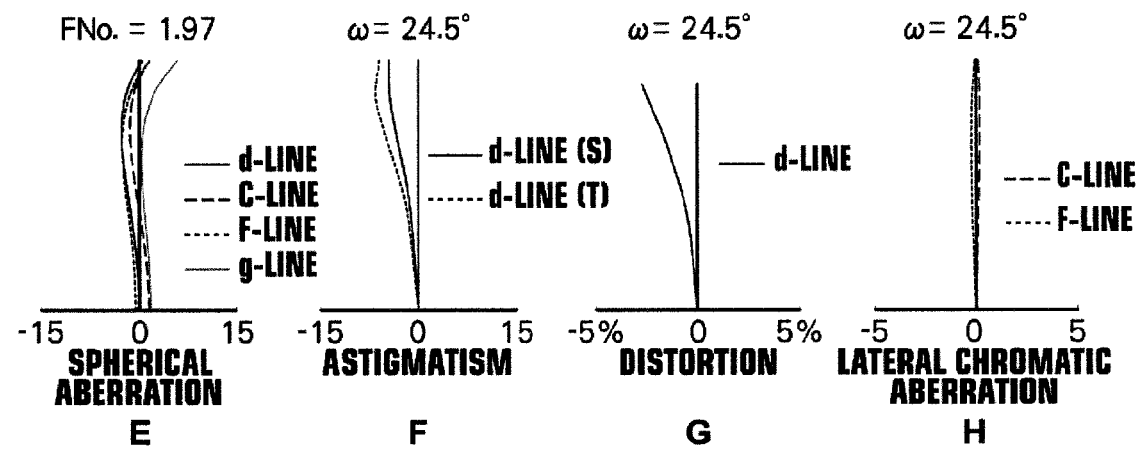

FIG.13
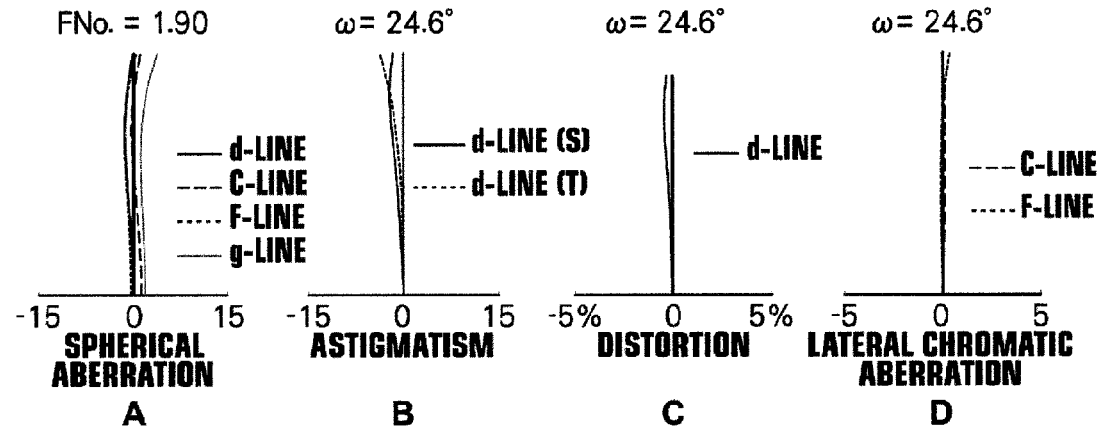
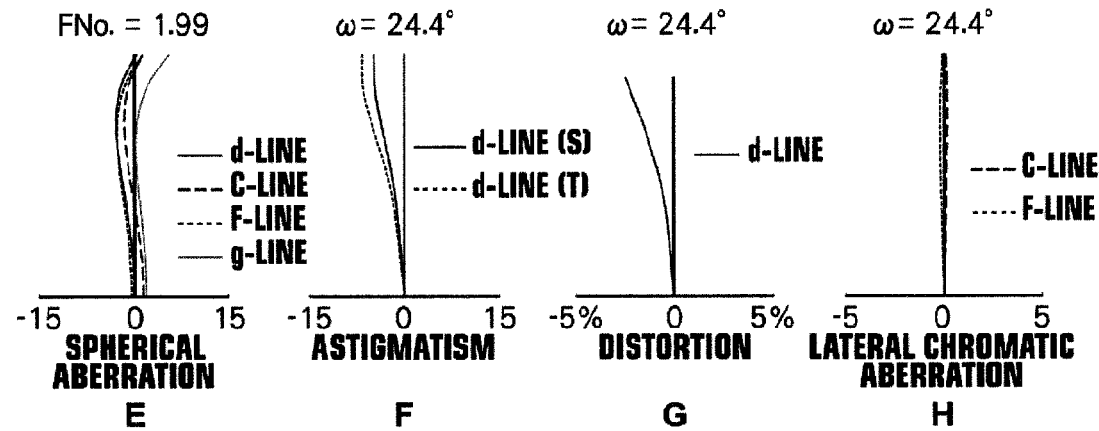

FIG.15
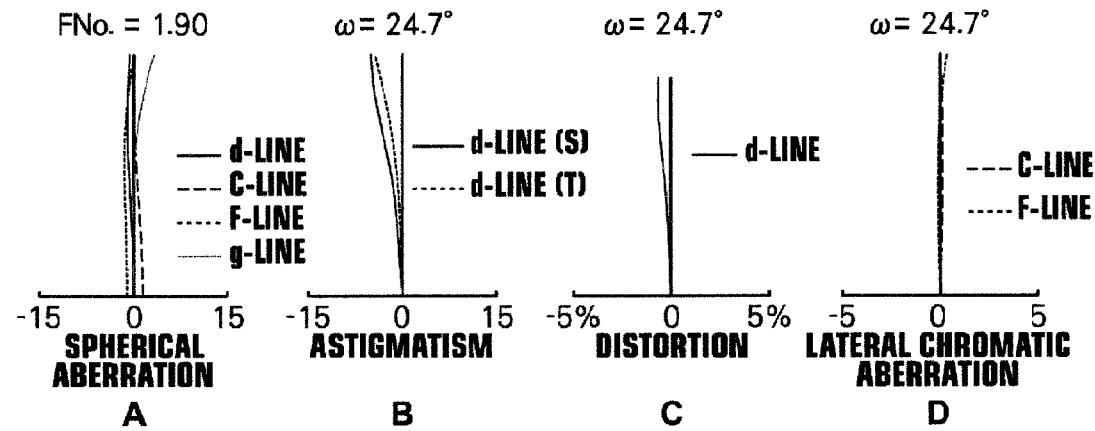
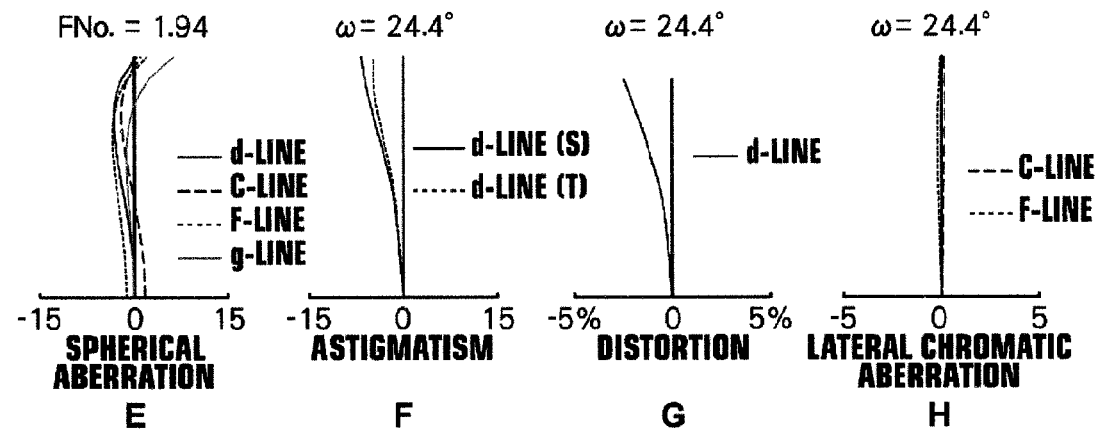

FIG.17
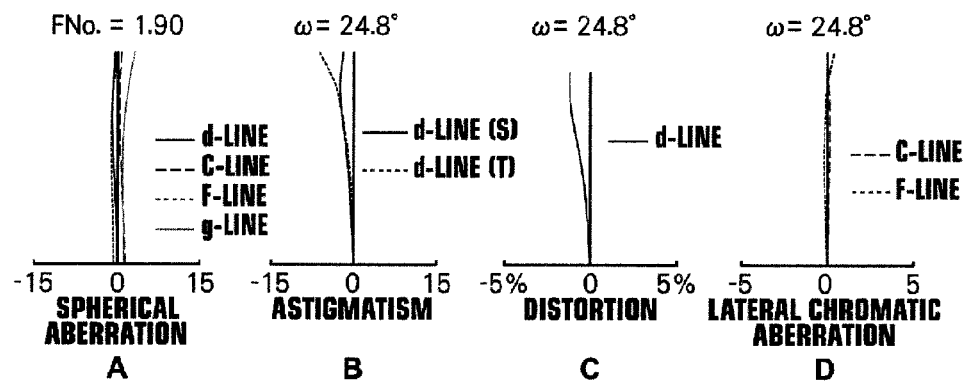
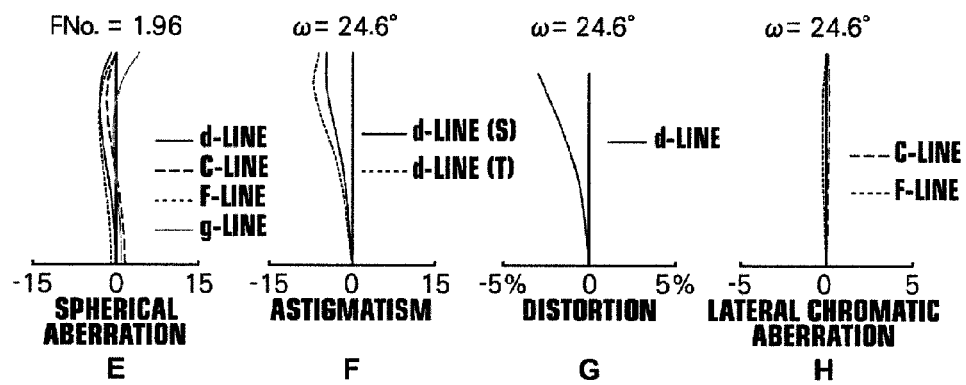

FIG.19
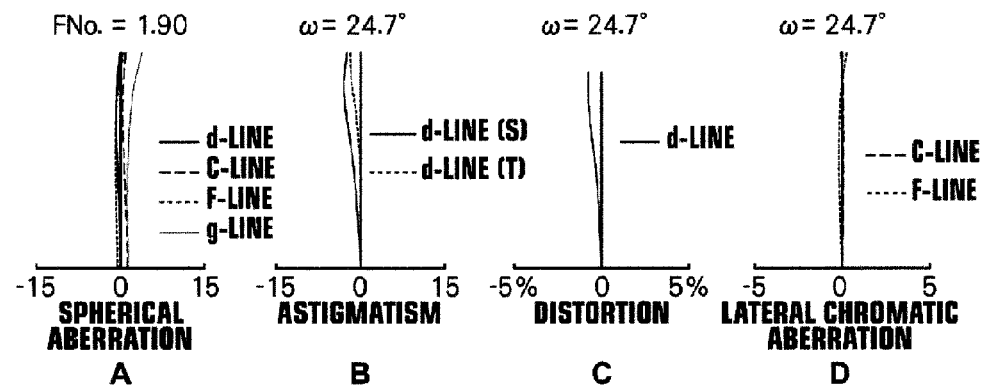
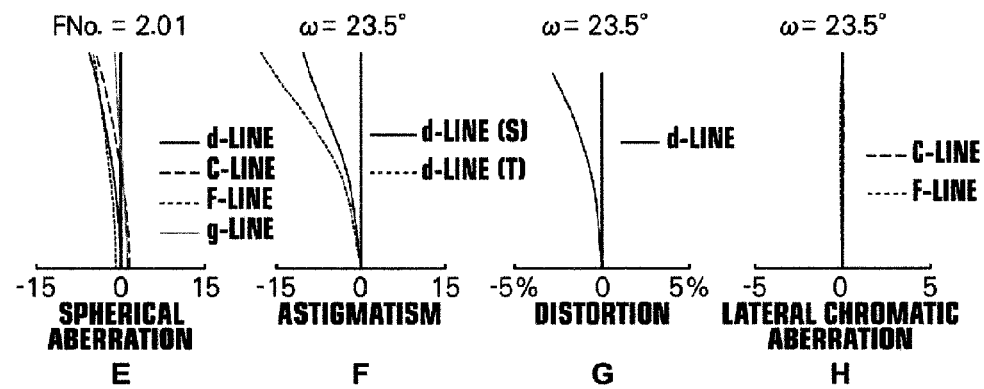

FIG.21
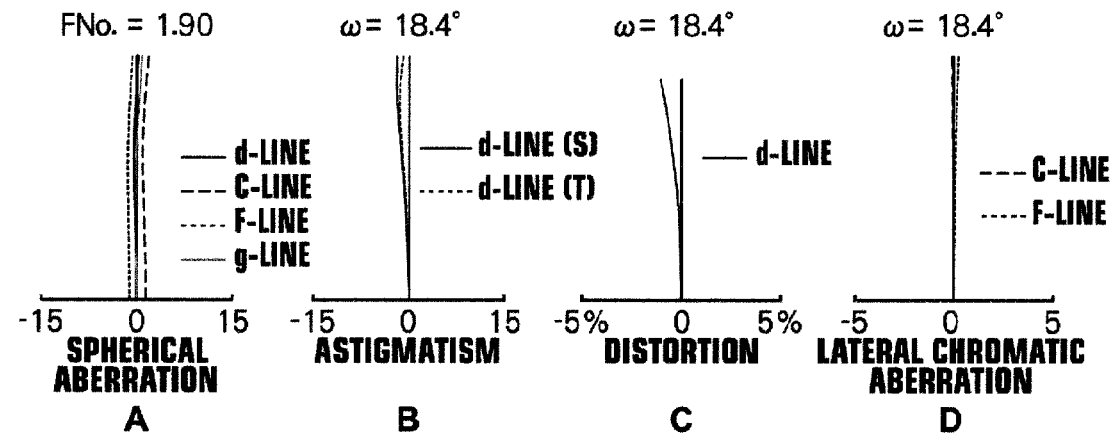
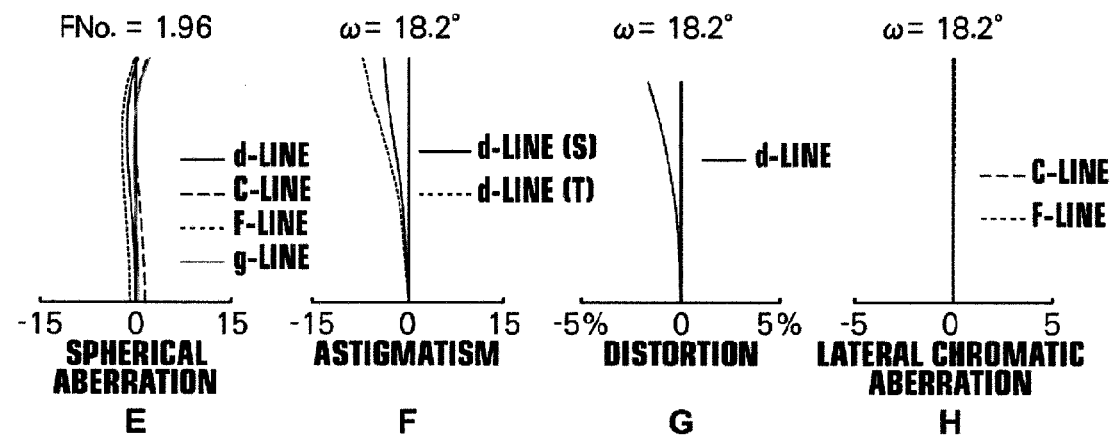

FIG.23
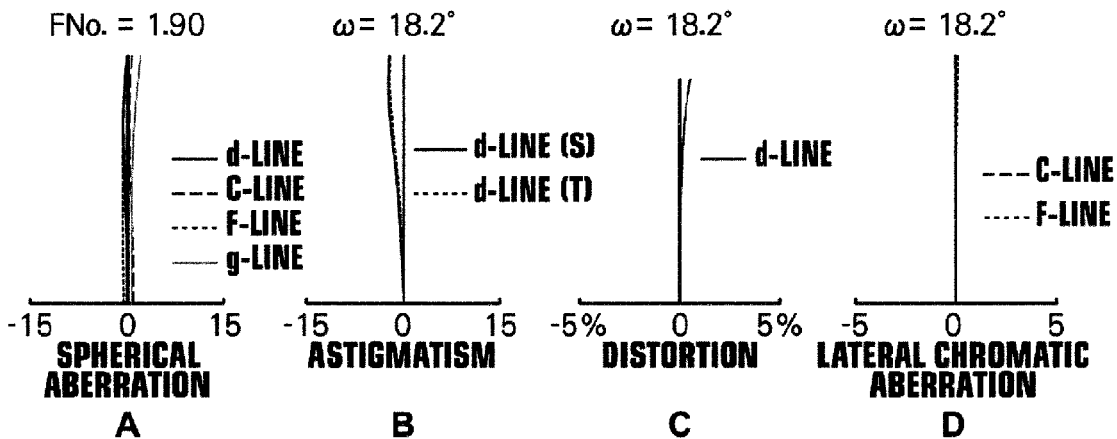
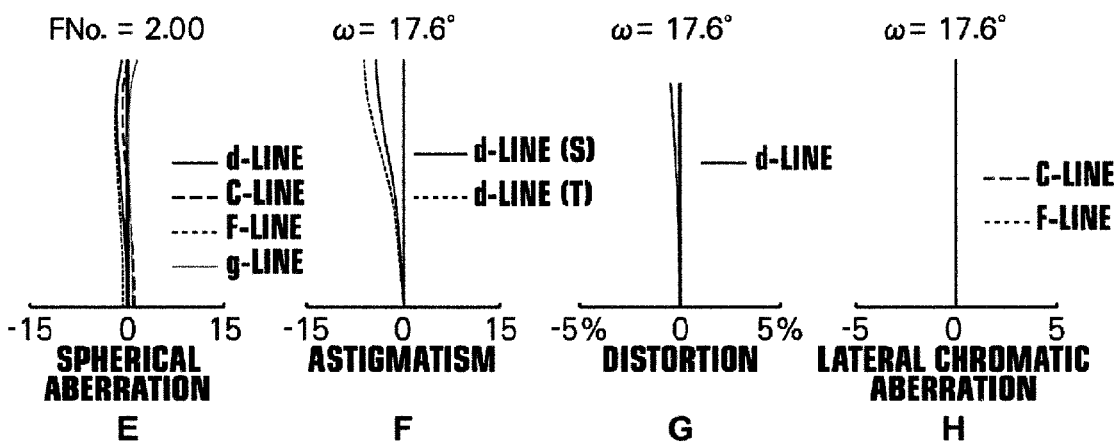

IMAGING LENS AND IMAGING APPARATUS

CROSS-REFERENCE TO RELATED APPLICATIONS

This application is a Continuation of PCT International Application No. PCT/JP2013/001169 filed on Feb. 27, 2013, which claims priority under 35 U.S.C. §119(a) to Japanese Patent Application No. 2012-064938 filed Mar. 22, 2012. Each of the above application(s) is hereby expressly incorporated by reference, in its entirety, into the present application.

BACKGROUND OF THE INVENTION

1. Technical Field

The present invention relates to an imaging lens and an imaging apparatus, and more particularly to an imaging lens that is used for film cameras, digital still cameras, broadcasting cameras, movie cameras and the like and that is used as an FA inspection machine lens, an image reading lens, and the like as well as an imaging apparatus provided with the imaging lens.

2. Description of the Related Art

A plurality of focus lenses, each having a two-group configuration, were proposed in past times as imaging lenses for use in imaging apparatuses such as video cameras, electronic still cameras, and the like in which imaging elements such as a CCD (Charge Coupled Device), a CMOS (Complementary Metal Oxide Semiconductor), and the like are applied as a recording medium.

SUMMARY OF THE INVENTION

A lens disclosed in Patent Document 1 (Japanese Patent No. 3331228) achieves a sufficient level of fastness and a wide angle of view. However, the lens has disadvantages from the viewpoint of cost, because the lens has two moving groups and an aspherical surface. Further, a resolution at peripheral portion of the lens is not improved due to an insufficient correction of aberrations.

Moreover, lenses disclosed in Patent Documents 2 and 3 (Japanese Patent No. 3352253 and Japanese Patent No. 3735909) are disadvantageous from the viewpoint of improved resolution due to having an F number of approximately 3. Further, the peripheral portions of the lenses do not have high performance because correction of aberrations is insufficient.

Lenses disclosed in Patent Documents 4 and 5 (Japanese Unexamined Patent Publication No. 2009-244699 and Japanese Unexamined Patent Publication No. 2009-276536) sufficiently achieve a level of fastness required for higher resolution, but correction of aberrations is insufficient to obtain high performance at the peripheral portions because of simplification of the configurations. Further, having aspherical surfaces is disadvantageous from the viewpoint of cost.

The present invention has been developed in view of the above circumstances. It is an object of the present invention to provide an imaging lens having a fast F number of approximately 2 and high performance, in which field curvature is corrected from the center of an image height to a peripheral portion, distortion is minimal, and chromatic aberration is satisfactorily corrected so as to achieve higher resolution. It is another object of the present invention to provide an imaging apparatus equipped with the imaging lens.

An imaging lens of the present invention substantially consists of a first lens group, a stop, and a second lens group in this order from the object side, the imaging lens performing focusing at each object distance by moving the second lens group along the optical axis;

the first lens group includes at least a positive lens disposed on the most-object side, a negative meniscus lens with a convex surface toward the object side, a biconcave negative lens, and a cemented lens substantially constituted by two lenses, which are a positive lens and a negative lens, in this order from the object side;

the second lens group includes at least a first positive lens with a convex surface toward the image side, which is disposed on the most-object side, a cemented lens substantially constituted by two lenses, which are a positive lens and a negative lens, and a second positive lens with a convex surface toward the image side, in this order from the object side; and conditional expression below is satisfied:

$$2.0 < f1a/f < 8.0 \quad (1),\text{where}$$

f1a: the focal length of the positive lens disposed on the most-object side in the first lens group, and
f: the focal length of the entire system at an object at infinity.

In this case, it is preferable for the imaging lens to satisfy conditional expression below:

$$2.3 < f1a/f < 6.5 \quad (1\text{-}1).$$

In addition, it is preferable for the imaging lens to have the negative meniscus lens and the biconcave negative lens in the first lens group arranged adjacent to each other and to satisfy conditional expression below:

$$-1.0 < ra/rb < -0.1 \quad (2)$$

$$0.1 < Ds/f < 0.6 \quad (3),\text{where}$$

ra: the radius of curvature of the image-side surface of the negative meniscus lens,
rb: the radius of curvature of the object-side surface of the biconcave negative lens, and
Ds: the distance between the image-side surface of the negative meniscus lens and the object-side surface of the biconcave negative lens along the optical axis.

In this case, it is preferable for conditional expression below to be satisfied:

$$-0.75 < ra/rb < -0.2 \quad (2\text{-}1)$$

$$0.18 < Ds/f < 0.45 \quad (3\text{-}1).$$

In addition, it is preferable for conditional expression below to be satisfied:

$$50 < \Sigma vm/2 \quad (4),\text{where}$$

$\Sigma vm$: the sum of the Abbe numbers of the negative meniscus lens and the biconcave negative lens in the first lens group.

In this case, it is preferable for conditional expression below to be satisfied:

$$60 < \Sigma vm/2 \quad (4\text{-}1).$$

In addition, it is preferable for the imaging lens to have a cemented lens substantially constituted by two lenses, which are a positive lens and a negative lens, in this order from the object side on the most-image side of the first lens group and to satisfy conditional expression below:

$$-0.3 < (rc-rd)/(rc+rd) < 0.5 \quad (5),\text{where}$$

rc: the radius of curvature of the object-side surface of the cemented lens, and
rd: the radius of curvature of the image-side surface of the cemented lens.

In this case, it is preferable for conditional expression below to be satisfied:

$$0.0 \leq (rc-rd)/(rc+rd) < 0.5 \tag{5-1}$$

Further, it is more preferable for conditional expression below to be satisfied:

$$0.1 < (rc-rd)/(rc+rd) < 0.3 \tag{5-2}$$

Further, it is preferable for conditional expression below to be satisfied:

$$1.0 < f2a/f < 8.0 \tag{6}$$

where f2a: the focal length of the positive lens disposed at the most-object side in the second lens group.

In this case, it is preferable for conditional expression below to be satisfied:

$$1.0 < f2a/f < 5.0 \tag{6-1}$$

In addition, it is more preferable for conditional expression below to be satisfied:

$$1.0 < f2a/f < 3.5 \tag{6-2}$$

In addition, it is preferable for conditional expression below to be satisfied:

$$55 < \Sigma vip/np \tag{7}$$

where $\Sigma vip$: the sum of the Abbe numbers of all the positive lenses within the second lens group, and
np: the number of all the positive lenses within the second lens group.

In this case, it is preferable for conditional expression below to be satisfied:

$$60 < \Sigma vip/np < 72 \tag{7-1}$$

In addition, it is more preferable for the imaging lens to have a positive lens at the most-image side in the second lens group and to satisfy conditional expression below:

$$-0.7 < rp/rq < 0.5 \tag{8}$$

where rp: the radius of curvature of the object-side surface of the positive lens at the most-image side in the second lens group, and
rq: the radius of curvature of the image-side surface of the positive lens at the most-image side in the second lens group.

In this case, it is preferable for conditional expression below to be satisfied:

$$-0.4 < rp/rq < 0.2 \tag{8-1}$$

In addition, it is more preferable for conditional expression below to be satisfied:

$$-0.4 < rp/rq \leq 0.0 \tag{8-2}$$

In addition, it is preferable for the most-image-side lens in the second lens group to be a cemented lens substantially constituted by two lenses, which are a negative lens and a positive lens in this order from the object side.

It is preferable for the first lens group to have two cemented lenses, each of which is substantially constituted by two lenses, which are a positive lens and a negative lens, on the image side of the biconcave negative lens.

In addition, it is preferable for each of the cemented lenses in the first lens group to be substantially constituted by two lenses, which are a positive lens and a negative lens in this order from the object side, and for a joint surface of at least one cemented lens to be of a concave shape on the object side.

In addition, it is preferable for the second lens group to have two cemented lenses, each of which is substantially constituted by two lenses which are a positive lens and a negative lens.

Further, it is preferable for conditional expression below to be satisfied:

$$2.0 < |ff/f| \tag{9}$$

where ff: the focal length of the first lens group.

In this case, it is preferable for conditional expression below to be satisfied:

$$2.0 < ff/f \tag{9-1}$$

In addition, it is preferable for conditional expression below to be satisfied:

$$0.5 < fr/f < 2.5 \tag{10}$$

where fr: the focal length of the second lens group.

In this case, it is preferable for conditional expression below to be satisfied:

$$0.8 < fr/f < 1.8 \tag{10-1}$$

Note that in the expression "a cemented lens substantially constituted by two lenses, which are a positive lens and a negative lens" of the aforementioned imaging lens, the arrangement order of a positive lens and a negative lens is not limited unless the order is particularly defined.

An imaging apparatus of the present invention is equipped with the imaging lens of the present invention described above.

An imaging lens of the present invention substantially consists of a first lens group, a stop, and a second lens group in this order from the object side, the imaging lens performs focusing at each focus distance by moving the second lens group along the optical axis;

the first lens group includes at least a positive lens disposed at the most-object side, a negative meniscus lens with a convex surface toward the object side, a biconcave negative lens, and a cemented lens substantially constituted by two lenses, which are a positive lens and a negative lens, in this order from the object side;

the second lens group includes at least a first positive lens with a convex surface toward the image side, which is disposed at the most-object side, a cemented lens substantially constituted by two lenses, which are a positive lens and a negative lens, and a second lens with a convex surface toward the image side, in this order from the object side; and conditional expression below is satisfied.

This can realize an imaging lens having a fast F number of approximately 2 and high performance, in which field curvature is corrected from the center of an image height to a peripheral portion, distortion is minimal, and chromatic aberration is satisfactorily corrected in order to achieve higher resolution.

$$2.0 < f1a/f < 8.0 \tag{1}$$

In addition, the imaging apparatus of the present invention is equipped with the imaging lens of the present invention. Therefore, bright and high-quality images can be obtained.

BRIEF DESCRIPTION OF THE DRAWINGS

FIG. 1 is a collection of a cross-sectional view illustrating the lens configuration of an imaging lens (which is the same as that of Example 1) according to an embodiment of the present invention.

FIG. 2 is a collection of a cross-sectional view illustrating the lens configuration of an imaging lens of Example 2 of the present invention.

FIG. 3 is a collection of a cross-sectional view illustrating the lens configuration of an imaging lens of Example 3 of the present invention.

FIG. 4 is a collection of a cross-sectional view illustrating the lens configuration of an imaging lens of Example 4 of the present invention.

FIG. 5 is a collection of a cross-sectional view illustrating the lens configuration of an imaging lens of Example 5 of the present invention.

FIG. 6 is a collection of a cross-sectional view illustrating the lens configuration of an imaging lens of Example 6 of the present invention.

FIG. 7 is a collection of a cross-sectional view illustrating the lens configuration of an imaging lens of Example 7 of the present invention.

FIG. 8 is a collection of a cross-sectional view illustrating the lens configuration of an imaging lens of Example 8 of the present invention.

A through H of FIG. 9 respectively illustrate aberration diagrams at INF and at a shortest distance of the imaging lens of Example 1 of the present invention.

Figure 10:
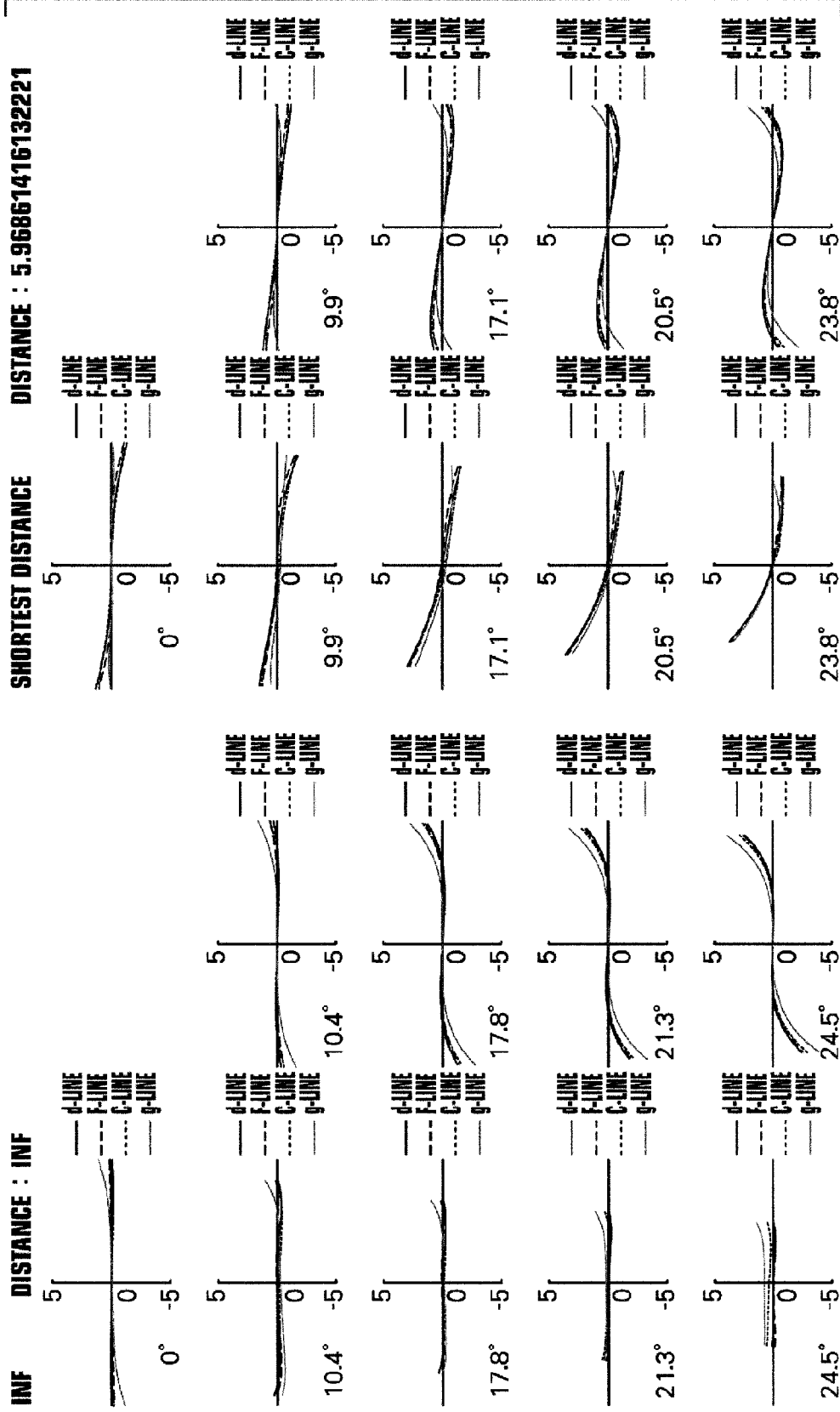

FIG. 10 illustrates lateral aberration diagrams at INF and at a shortest distance of the imaging lens of Example 1 of the present invention.

A through H of FIG. 11 respectively illustrate aberration diagrams at INF and at a shortest distance of the imaging lens of Example 2 of the present invention.

Figure 12:
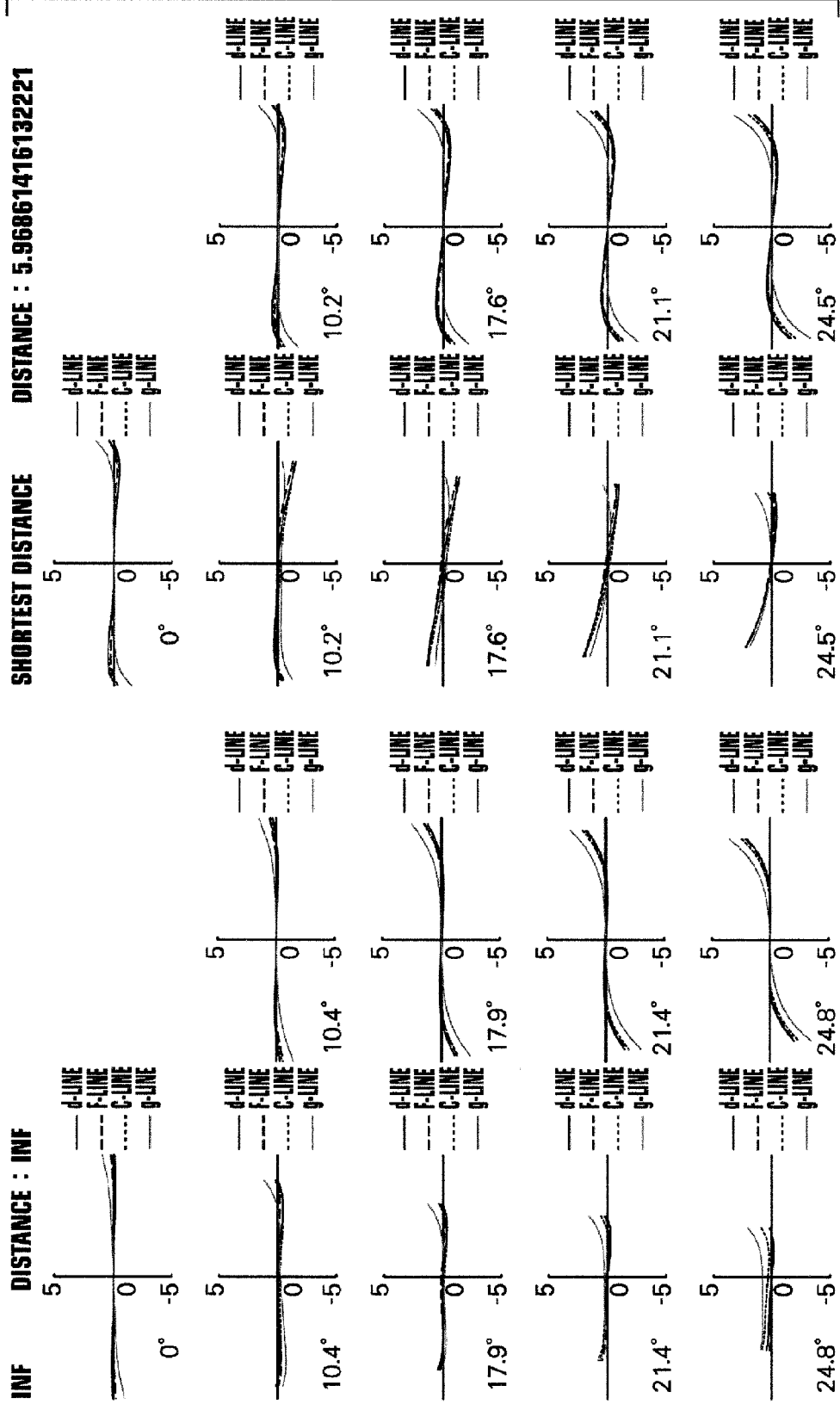

FIG. 12 illustrates lateral aberration diagrams at INF and at a shortest distance of the imaging lens of Example 2 of the present invention.

A through H of FIG. 13 respectively illustrate aberration diagrams at INF and at a shortest distance of the imaging lens of Example 3 of the present invention.

Figure 14:
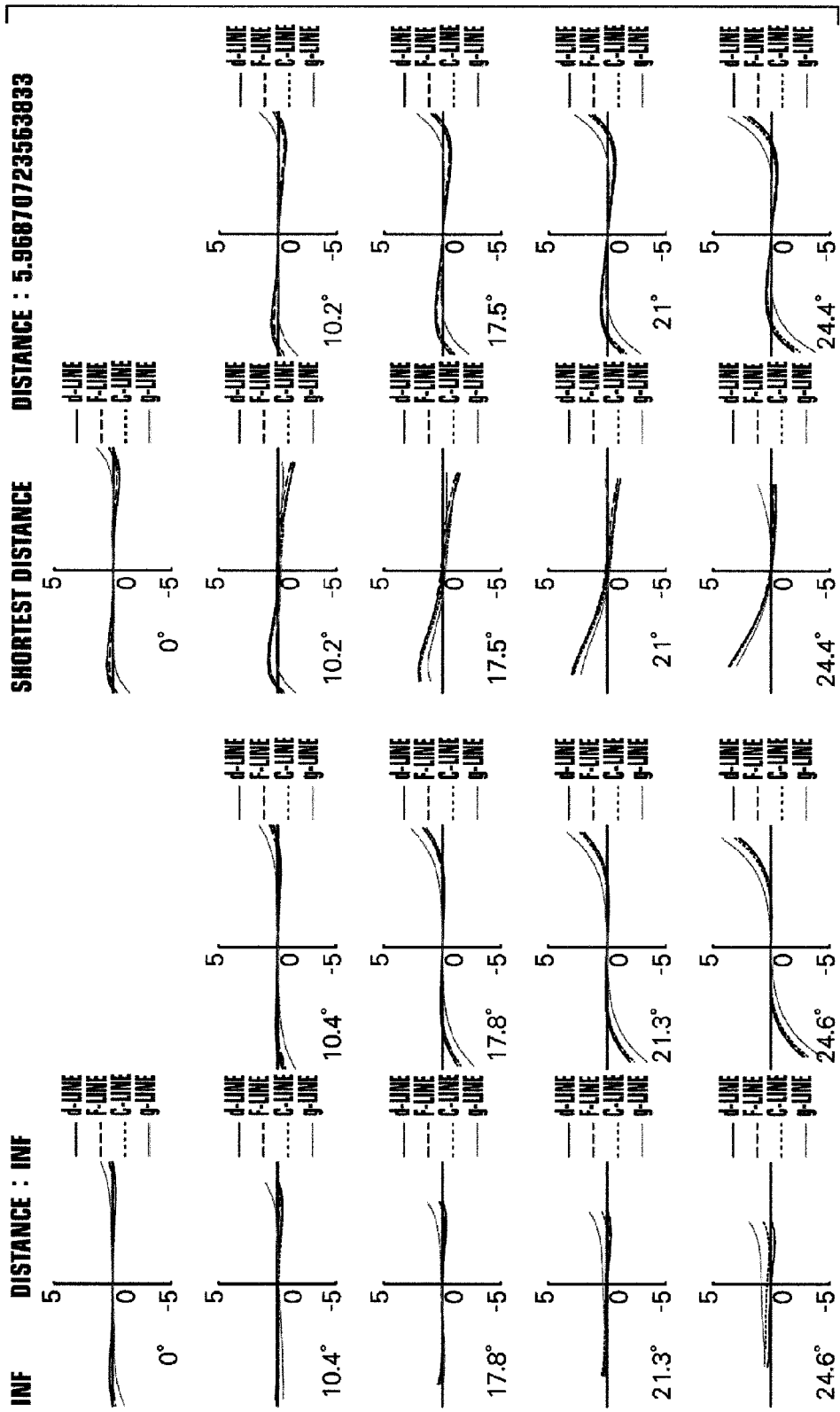

FIG. 14 illustrates lateral aberration diagrams at INF and at a shortest distance of the imaging lens of Example 3 of the present invention.

A through H of FIG. 15 respectively illustrate aberration diagrams at INF and at a shortest distance of the imaging lens of Example 4 of the present invention.

Figure 16:
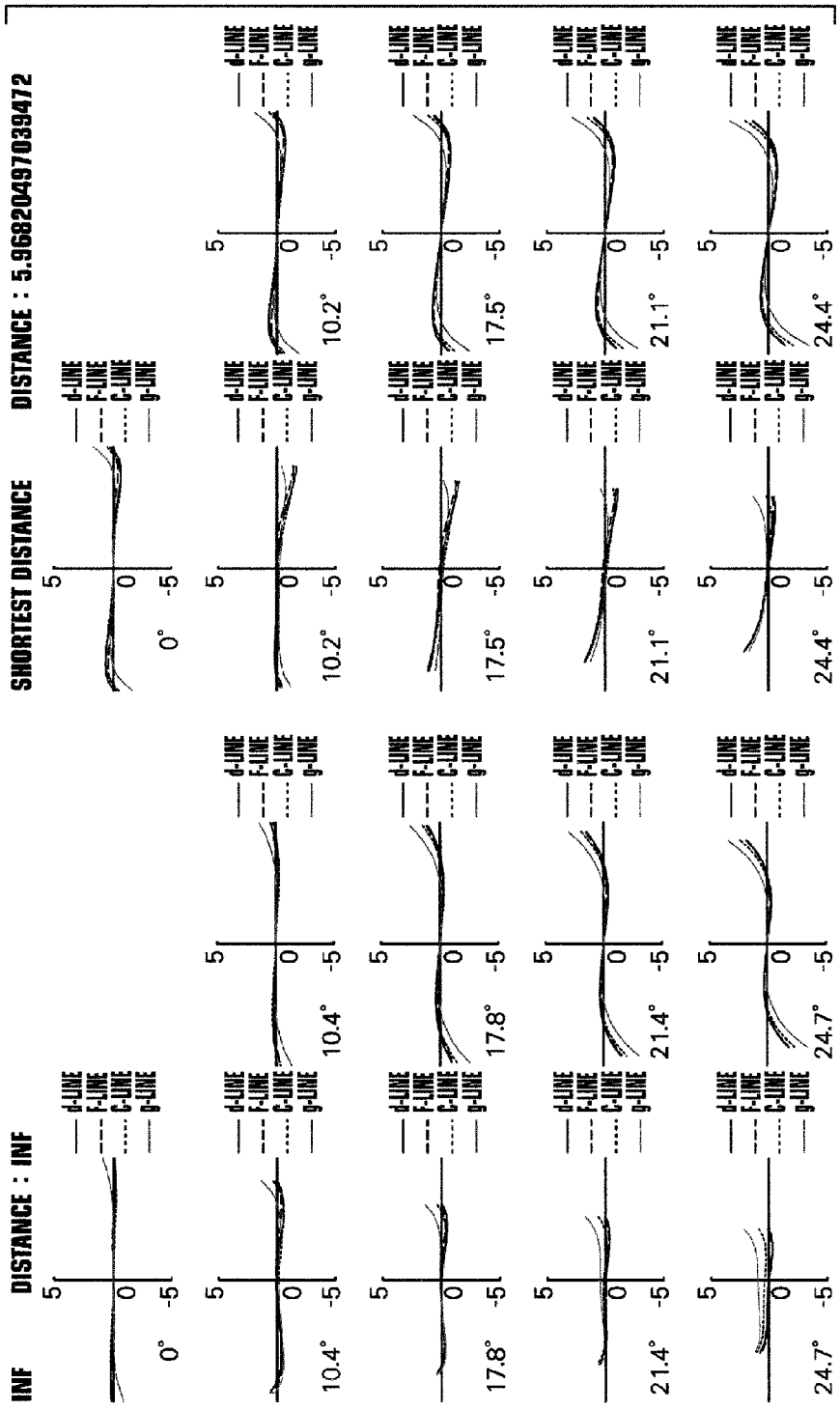

FIG. 16 illustrates lateral aberration diagrams at INF and at a shortest distance of the imaging lens of Example 4 of the present invention.

A through H of FIG. 17 respectively illustrate aberration diagrams at INF and at a shortest distance of the imaging lens of Example 5 of the present invention.

Figure 18:
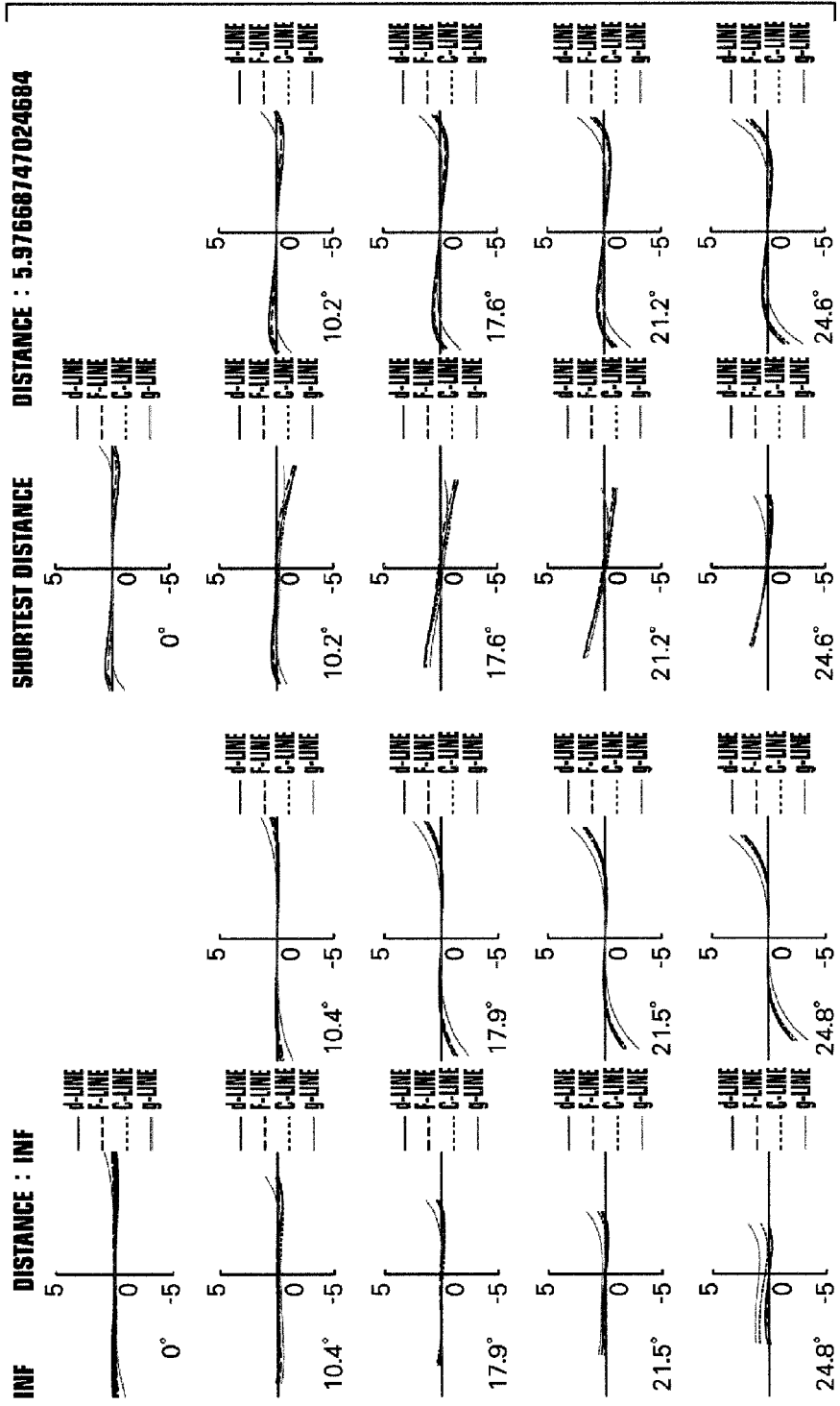

FIG. 18 illustrates lateral aberration diagrams at INF and at a shortest distance of the imaging lens of Example 5 of the present invention.

A through H of FIG. 19 respectively illustrate aberration diagrams at INF and at a shortest distance of the imaging lens of Example 6 of the present invention.

Figure 20:
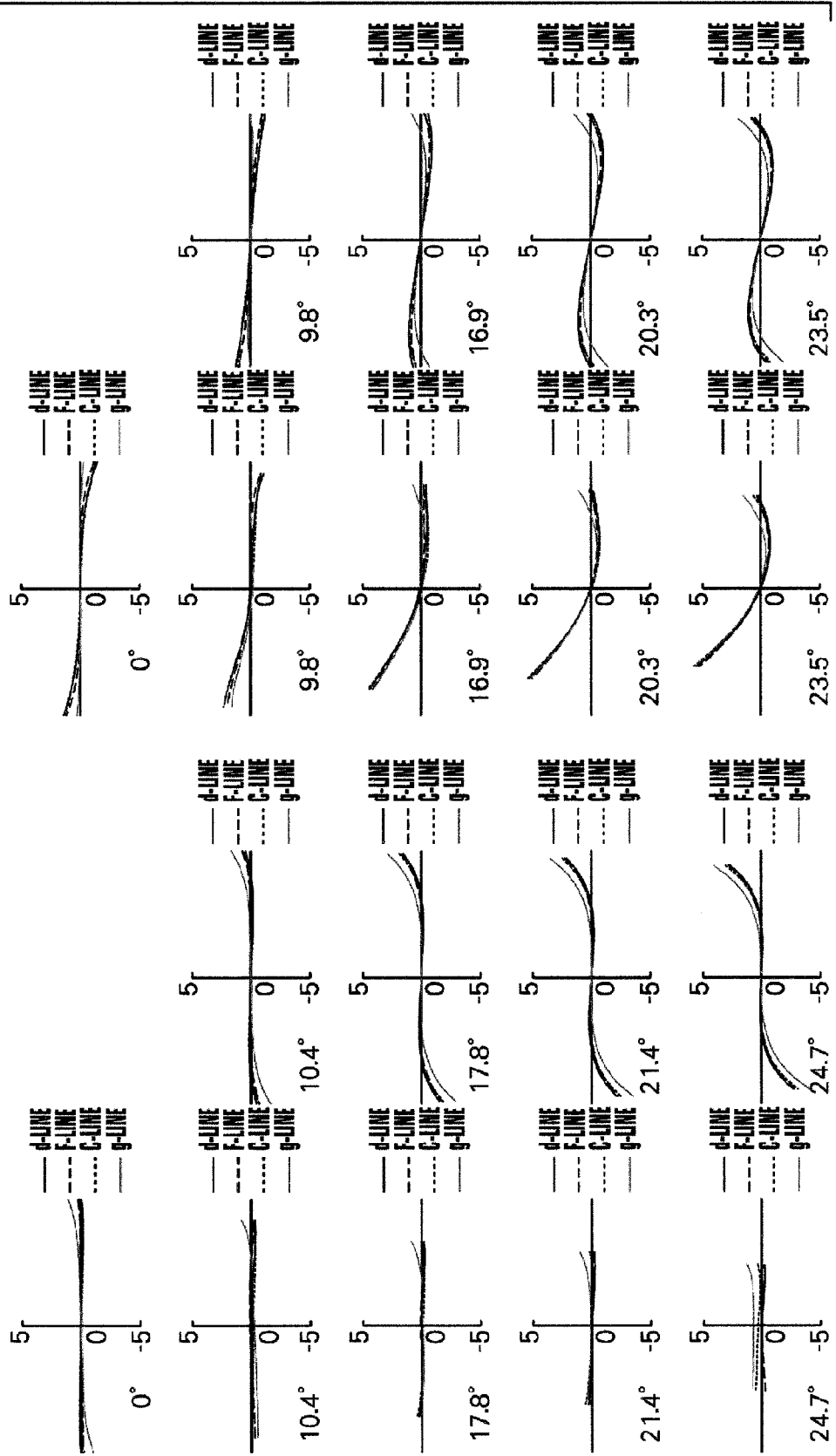

FIG. 20 illustrates lateral aberration diagrams at INF and at a shortest distance of the imaging lens of Example 6 of the present invention.

A through H of FIG. 21 respectively illustrate aberration diagrams at INF and at a shortest distance of the imaging lens of Example 7 of the present invention.

Figure 22:
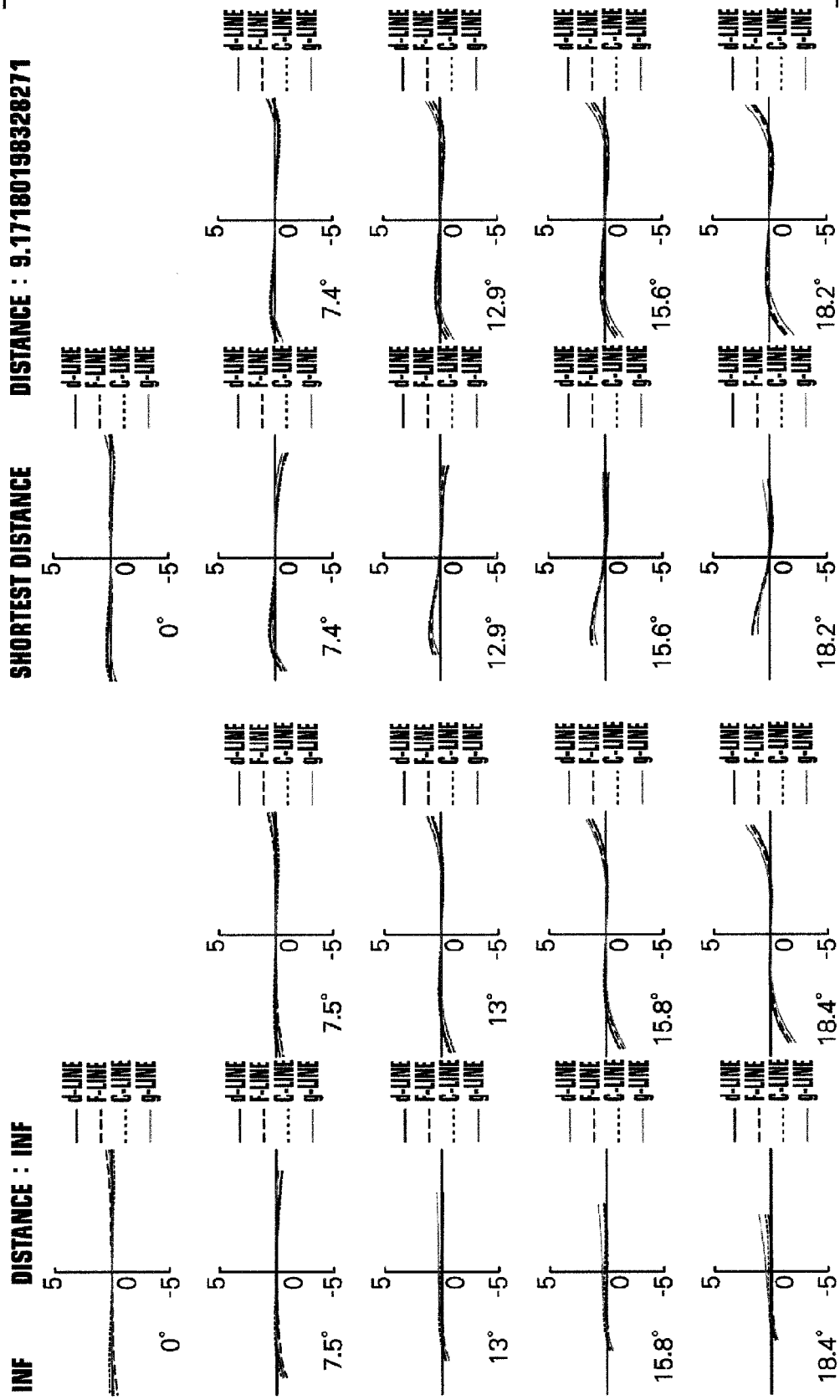

FIG. 22 illustrates lateral aberration diagrams at INF and at a shortest distance of the imaging lens of Example 7 of the present invention.

A through H of FIG. 23 respectively illustrate aberration diagrams at INF and at a shortest distance of the imaging lens of Example 8 of the present invention.

Figure 24:
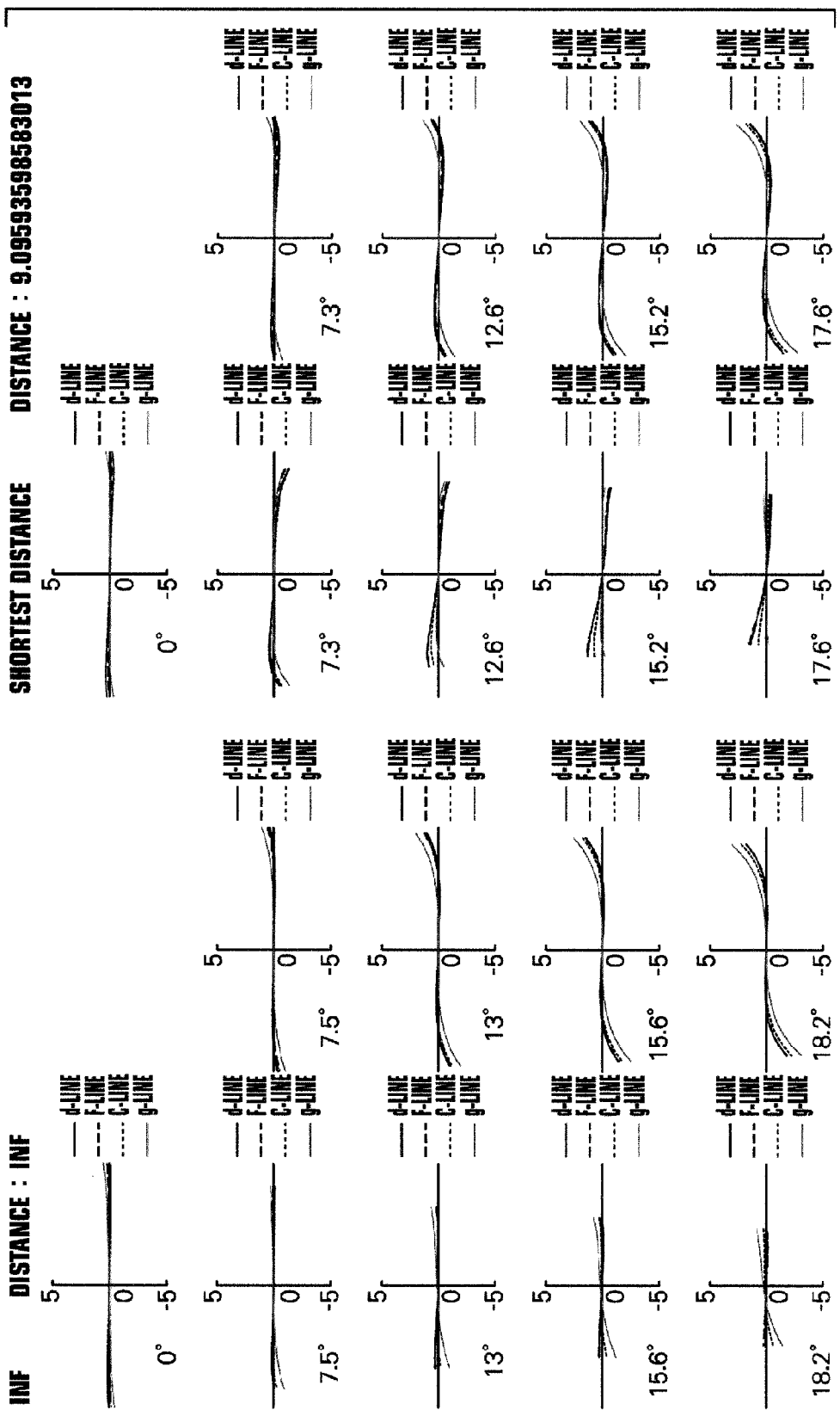

FIG. 24 illustrates lateral aberration diagrams at INF and at a shortest distance of the imaging lens of Example 8 of the present invention.

Figure 25:
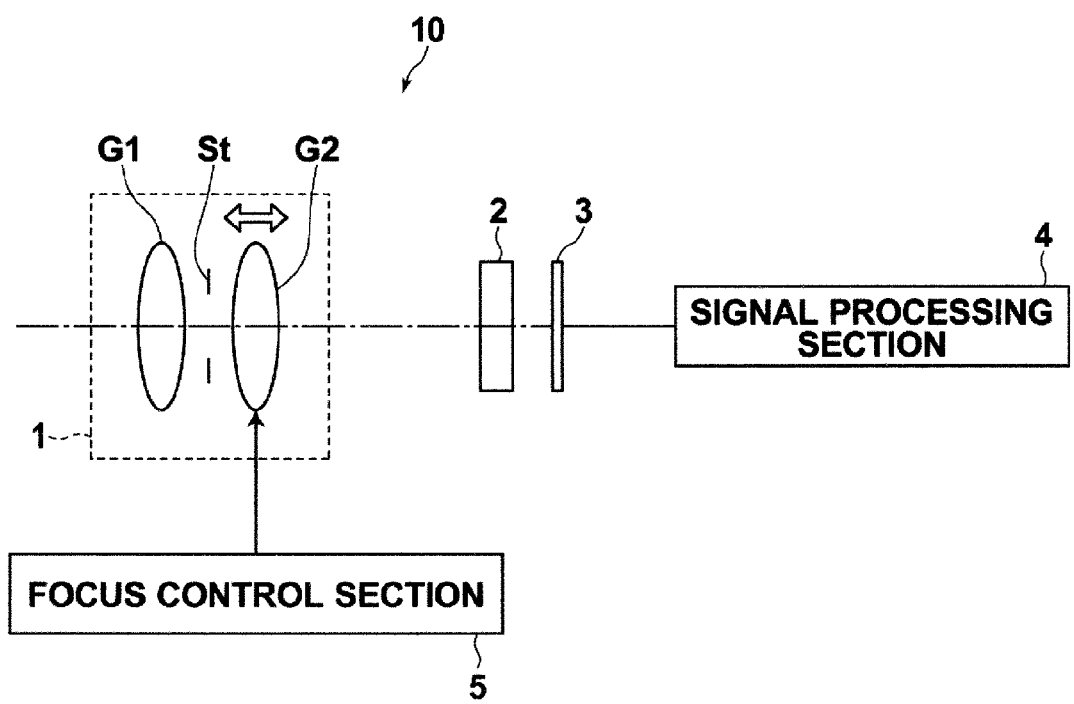

FIG. 25 illustrates a schematic configuration of an imaging apparatus according to the embodiment of the present invention.

DESCRIPTION OF THE PREFERRED EMBODIMENTS

Hereinafter, embodiments of the present invention will be described in detail with reference to the accompanying drawings. FIG. 1 is a cross-sectional view illustrating the lens configuration of an imaging lens (which is the same as that of Example 1) according to an embodiment of the present invention. The example of configurations shown in FIG. 1 is the same as the configuration of the imaging lens in Example 1 to be described below. In FIG. 1, the left side is the object side, and the right side is the image side.

This imaging lens substantially consists of a first lens group G1 which is fixed while focusing, an aperture stop St, and a second lens group G2 which moves while focusing in this order from the object side along the optical axis Z. Further, this imaging lens performs focusing by moving the second lens group G2 along the optical axis. Note that the aperture stop St shown in FIG. 1 does not necessarily represent the size or shape thereof, but the position thereof on the optical axis Z.

When this imaging lens is applied for use in an imaging apparatus, it is preferable for a cover glass, a prism, various types of filters, such as an infrared cut filter, a low-pass filter, and the like to be disposed between the optical system and an image surface Sim according to the configuration of a camera side to which the lens is mounted. FIG. 1 shows an example in which a plane parallel optical member PP that presumes these elements is disposed between the third lens group G3 and the image surface Sim. Note that the position, thickness or characteristic of the optical member PP is not limited, but should be considered according to the performance required of the imaging lens. Further, the optical member PP may not be provided.

It is preferable for the imaging lens to have an aperture which controls luminous fluxes in order to remove flare components of comatic aberration and obtain high imaging performance. Therefore, FIG. 1 shows the example in which a luminous flux control surface F that presumes the aperture is disposed between the aperture stop St and the second lens group G2. Note that the position or aperture diameter of the luminous flux control surface F is not limited, but should be considered according to the performance required of the imaging lens. The luminous flux control surface F may not be displayed.

The first lens group G1 consists of a positive lens L11, a negative meniscus lens L12 with a convex surface toward the object side, a biconcave negative lens L13, a negative meniscus lens L14 with a convex surface toward the object side, a cemented lens constituted by two lenses, which are a positive lens L15 and a negative lens L16, and a cemented lens constituted by two lenses, which are a positive lens L17 and a negative lens L18, in this order from the object side.

In the first lens group G1, the positive lens L11 disposed on the most-object side mainly corrects distortion with satisfaction; the negative meniscus lens L12 with a convex surface toward the object side and the biconcave negative lens L13 mainly secure back focus and further correct coma aberration; and the cemented lens disposed on the most-image side mainly corrects spherical aberration and chromatic aberration.

The second lens group G2 consists of a positive lens L21 with a convex surface toward the image side, a cemented lens constituted by two lenses, which are a negative lens L22 and a positive lens L23, a positive lens L24 with a convex surface toward the image side, and a positive lens L25 in this order from the object side.

In the second lens group G2, comatic aberration and chromatic aberration are mainly corrected as a whole. In addition, focusing at each object distance is performed by moving the second lens group G2 along the optical axis and high performance is obtained even if the object distance is changed from infinity to a close distance of less than or equal to 1 m.

In the first lens group G1, it is effective to administer correction at positions where luminous fluxes which respectively converge at image heights are separated in order to correct distortion satisfactorily. Therefore, the correction should be made at the most-object side of the first lens group G1. By disposing a lens of which the positive refractive power gradually increases as the image height becomes higher, a divergence characteristic can be suppressed and the occurrence of a large negative distortion can be prevented even if a negative lens disposed adjacent thereto has a stronger refractive power.

Conditional expression (1) below is prepared to correct distortion satisfactorily. The imaging lens according to the present embodiment is configured to satisfy conditional expression (1) below. Note that by satisfying conditional expression (1-1) below, the imaging lens with higher performance can be obtained.

If the value of f1a/f exceeds the upper limit defined by conditional expression (1), a large difference in refractive powers which respectively contribute to the image heights will be eliminated, and thereby a correction will be insufficient. If the value of f1a/f falls below the lower limit defined by conditional expression (1) and the refractive power of the positive lens L11 disposed on the most-object side in the first lens group becomes stronger, over-correction will occur. Furthermore, a correction will be required for a negative lens disposed adjacent thereto, and therefore the degree of freedom in the design of each lens will decrease and a lens performance will deteriorate.

$$2.0 < f1a/f < 8.0 \quad (1)$$

$$2.3 < f1a/f < 6.5 \quad (1\text{-}1), \text{ where}$$

f1a: the focal length of the positive lens L11 disposed on the most-object side in the first lens group G1, and
f: the focal length of the entire system at an object at infinity.

Further, in the first lens group G1, a negative meniscus lens L12 and a biconcave negative lens L13 are disposed adjacent to each other, separating of luminous fluxes respectively corresponding to image heights is achieved and distortion and downward comatic aberration are satisfactorily corrected by the peripheral ray appropriately refracting in a direction away from the optical axis.

It is preferable for conditional expressions (2) and (3) below to be satisfied in order to favorably separate luminous fluxes respectively corresponding to image heights. Note that an imaging lens with higher performance can be obtained by satisfying conditional expressions (2-1) and (3-1) below.

If the radius of curvature rb of the object-side surface of the biconcave negative lens L13 decreases and the value of ra/rb falls below the lower limit defined by conditional expression (2), the angle formed by a ray which enters the negative lens L13 and the surface normal line at a point where the ray passes through the negative lens L13 becomes larger and thereby high-order comatic aberration will be likely to occur. If the radius of curvature ra of the image-side surface of the negative meniscus lens L12 decreases and the value of ra/rb exceeds the upper limit defined by conditional expression (2), the divergence power of the negative meniscus lens L12 will excessively increase and a large negative distortion and positive spherical aberration will occur. Therefore, correcting aberrations will be difficult.

In the case that the value of Ds/f falls below the lower limit defined by conditional expression (3), favorable performance cannot be obtained. This is because the radii of curvature ra and rb will become smaller, which is not favorable as described above. In addition, in the case that the value of Ds/f exceeds the upper limit defined by conditional expression (3), the accuracy of correcting aberrations will be enhanced, but the total length of the lens will be increased, which is not favorable in general.

$$-1.0 < ra/rb < -0.1 \quad (2)$$

$$0.1 < Ds/f < 0.6 \quad (3)$$

$$-0.75 < ra/rb < -0.2 \quad (2\text{-}1)$$

$$0.18 < Ds/f < 0.45 \quad (3\text{-}1), \text{ where}$$

ra: the radius of curvature of the image-side surface of the negative meniscus lens L12,
rb: the radius of curvature of the object-side surface of the biconcave negative lens L13, and
Ds: the distance between the negative meniscus lens and the biconcave negative lens along the optical axis.

It is preferable for the negative meniscus lens L12 and a biconcave negative lens L13 in the first lens group G1 to employ materials with large Abbe numbers and to satisfy conditional expression (4) below so as to suppress the occurrence of longitudinal chromatic aberration. Note that the imaging lens with higher performance can be obtained by satisfying conditional expression (4-1) below.

Application of materials which have larger divergence characteristics which are out of the range defined by conditional expression (4) will increase longitudinal chromatic aberration and particularly deteriorate resolutions in the paraxial regions.

$$50 < \Sigma vm/2 \quad (4)$$

$$60 < \Sigma vm/2 \quad (4\text{-}1), \text{ where}$$

$\Sigma vm$: the sum of the Abbe numbers of the negative meniscus lens and the biconcave negative lens in the first lens group.

Further, the first lens group G1 includes at least one cemented lens constituted by two lenses, which are a positive lens and a negative lens, on the image side of the biconcave negative lens L13. Thereby, spherical aberration, longitudinal chromatic aberration, and lateral chromatic aberration are mainly corrected. On the axis, large positive spherical aberration, which occurs due to divergence of rays in a lens group disposed on the object side of the cemented lens, is satisfactorily corrected by the rays gradually condensing. Further, longitudinal chromatic aberration can be corrected by lenses of a condensing section constituting an achromatic lens. In addition, in off-axis rays, the lens group on the object side from the cemented lens separates luminous fluxes which respectively correspond to image heights, and therefore lateral chromatic aberration can be effectively corrected.

In order to perform such a correction satisfactorily, it is preferable for a lens disposed at the most-image side of the first lens group G1 to be a cemented lens constituted by a positive lens L17 and a negative lens L18 in this order from the object side and to have a shape which satisfies conditional expression (5) below. Note that the image lens with higher performance can be obtained by satisfying conditional expressions (5-1) and (5-2) below.

If the value of (rc−rd)/(rc+rd) falls below the lower limit defined by conditional expression (5), positive refractive powers of a front and back surfaces of the cemented lens will be excessively increased and a strong condensing action will be obtained. Therefore, negative spherical aberration will occur along the axis and high-order comatic aberration will occur outside the axis. As a result, correcting aberrations satisfactorily will be difficult. In particular, as the second lens group G2 moves according to changes in the object distance to perform focusing, it is not suitable for large aberrations to occur in the first lens group G1 for obtaining favorable performance from infinity to a shortest distance. If the value of (rc−rd)/(rc+rd) exceeds the upper limit defined by conditional expression (5), the condensing action of the cemented lens will become weaker and the spherical aberration and chromatic aberration will not be corrected satisfactorily.

$$-0.3<(rc-rd)/(rc+rd)<0.5 \quad (5)$$

$$0.0 \leq (rc-rd)/(rc+rd)<0.5 \quad (5\text{-}1)$$

$$0.1<(rc-rd)/(rc+rd)<0.3 \quad (5\text{-}2), \text{ where}$$

rc: the radius of curvature of the object-side surface of the cemented lens, and
rd: the radius of curvature of the image-side surface of the cemented lens.

When elements such as a CCD and the like are used in an imaging section, decreasing the angle of light entering the image surface is effective for preventing high resolution and unevenness of density. Further, by setting the most-object-side lens of the second lens group G2 to be a positive lens L21, an off-axis luminous flux can be caused to gradually approach the optical axis and the angle of incident on the image surface can be controlled. Therefore, it is preferable for refractive index of the positive lens L21 to be selected within the range which satisfies conditional expression (6). Note that the imaging lens with higher performance can be obtained by satisfying conditional expressions (6-1) and (6-2) below.

By selecting the refractive index of the positive lens L21 within the range which satisfies conditional expression (6), the angle of incidence on the image surface can be appropriately corrected while luminous fluxes respectively corresponding to image heights can be separated.

$$1.0<f2a/f<8.0 \quad (6)$$

$$1.0<f2a/f<5.0 \quad (6\text{-}1)$$

$$1.0<f2a/f<3.5 \quad (6\text{-}2), \text{ where}$$

f2a: the focal length of the positive lens L21 disposed on the most-object side in the second lens group.

It is preferable for the positive lens L21 to have a meniscus shape with a convex surface toward the image side. Thereby, the angle formed by the incidence angles of off-axis rays and the normal line can be relatively decreased and therefore high-order comatic aberration can be prevented from occurring.

A cemented lens is arranged in the second lens group G2 in the same manner as in the first lens group G1. Thereby, lateral chromatic aberrations can be satisfactorily corrected. Therefore, it is preferable for the second lens group G2 to include at least one cemented lens. In addition, it is preferable for positive lenses having the condensing action to employ materials with large Abbe numbers so as to minimize the fluctuations in lateral chromatic aberration which occurs while the second lens group G2 performs focusing. Therefore, it is preferable for conditional expression (7) below to be satisfied. Note that the imaging lens with higher performance can be obtained by satisfying conditional expression (7-1) below.

Selecting materials for positive lenses in such a manner that conditional expression (7) is satisfied enables higher performance, the fluctuations in lateral chromatic aberration being suppressed from infinity to a short distance. In addition, in conditional expression (7-1) which defines more favorable range, if the value of Σvip/np exceeds the upper limit defined by conditional expression (7), a large number of materials having low refractive indexes will be employed and correcting of field curvature, comatic aberration, and the like will be difficult.

$$55<\Sigma vip/np \quad (7)$$

$$60<\Sigma vip/np<72 \quad (7\text{-}1), \text{ where}$$

Σvip: the sum of the Abbe numbers of all the positive lenses within the second lens group G2, and
np: the number of all the positive lenses within the second lens group G2.

Further, the angle of incidence on the image surface can be controlled effectively by setting the most-image-side lens of the second lens group G2 to be a positive lens. Therefore, it is preferable for the most-image-lens of the second lens group G2 to be a positive lens and for conditional expression (8) below to be satisfied. Note that the imaging lens with higher performance can be obtained by satisfying conditional expressions (8-1) and (8-2).

If the value of rp/rq falls below the lower limit defined by conditional expression (8), the absolute value of the radius of curvature of the image-side surface of the positive lens L25 will be decreased and control of the light entering the image surface will be insufficient. In addition, in the case that the value of rp/rq exceeds the upper limit defined by conditional expression (8) and the image-side surface of the positive lens L25 becomes a concave shape surface, high-order aberrations will be likely to occur in the rays away from the optical axis. Further, the concave surface which faces the image surface will returns the reflected light from a sensor surface, filters, and the like to the image surface. This is likely to cause flares.

$$-0.7<rp/rq<0.5 \quad (8)$$

$$-0.4<rp/rq<0.2 \quad (8\text{-}1)$$

$$-0.4<rp/rq \leq 0.0 \quad (8\text{-}2), \text{ where}$$

rp: the radius of curvature of the object-side surface of the positive lens on the most-image side in the second lens group, and
rq: the radius of curvature of the image-side surface of the positive lens on the most-image side in the second lens group.

It is preferable for a lens disposed on the most-image side of the second lens group G2 to be a cemented lens constituted by two lenses which are a negative lens and a positive lens in this order from the object side. Thereby, the luminous fluxes respectively corresponding to image heights can be separated while the light entering the image surface can be controlled. Therefore, the luminous fluxes can be focused on the image surface while various aberrations, such as field curvature, lateral chromatic aberration, comatic aberration and the like, can be finely adjusted. Accordingly, higher performance can be obtained.

It is preferable for the first lens group G1 to be provided with two cemented lenses, each of which is constituted by two lenses, which are a positive lens and a negative lens. Thereby, correcting of longitudinal chromatic aberration and lateral chromatic aberration can be shared between the two cemented lenses and accordingly the radius of curvature of each surface can be made relatively large. Therefore, the occurrence of the high-order spherical aberration and comatic aberration can be suppressed.

Further, it is preferable for each of the cemented lenses in the first lens group G1 to be constituted by two lenses, which are a positive lens and a negative lens in this order from the object side, and for a joint surface of at least one cemented lens to be of a concave shape on the object side so as to correct negative distortion more satisfactorily. Thereby, the angle formed by the ray entering the joint surface and a surface normal line at a point where the entering rays passes through the joint surface can be increased. Therefore, refraction of the rays toward the optical axis side will be facilitated and the degrees of freedom in the correction of negative distortion will increase. In addition, it is preferable for each of the cemented lenses to have a positive refractive power so as to correct aberrations while gradually condensing the light flux which has greatly diverged in the front of the cemented lens to secure back focus and to widen an angle of view.

It is also preferable for the second lens group G2 to be provided with two cemented lenses, each of which is constituted by two lenses, which are a positive lens and a negative lens. Thereby, corrections of longitudinal chromatic aberration and lateral chromatic aberration can be shared between the two cemented lenses and accordingly the radius of curvature of each surface can be made relatively large. Therefore, the occurrence of the high-order spherical aberration and comatic aberration can be suppressed.

In addition, it is preferable for the first lens group G1 to have longer back focus compared to the back focus of the entire system so as to satisfy conditional expression (9). Thereby, the angle of each ray which enters the second lens group G2 can be reduced in the central luminous flux, and the fluctuation in spherical aberration, which occurs while the second lens group G2 focusing, can be reduced. Note that the central luminous flux can be prevented from entering the second lens group G2 as a diverging light and the convergence action of the second lens group G2 can be supplemented by satisfying conditional expression (9-1) below. Therefore, aberration corrections can be performed more satisfactorily.

$$2.0 < |ff/f| \quad (9)$$

$$2.0 < ff/f \quad (9\text{-}1), \text{where}$$

ff: the focal length of the first lens group.

In addition, it is preferable for the second lens group G2 to satisfy conditional expression (10) because there is demand for the amount of movement thereof while focusing to be appropriately suppressed for miniaturization of the entire lens system. Note that the imaging lens with higher performance can be obtained by satisfying conditional expression (10-1) below.

If the value of fr/f falls below the lower limit defined by conditional expression (10), the amount of movement of the second lens group G2 can be suppressed, but the refractive power of the second lens group G2 will become stronger. Accordingly, fluctuations in aberrations while focusing will be increased, and therefore favorable performance cannot be obtained. In addition, the sensitivity of the movement of a focus point with respect to the amount of movements will be increased and a moving mechanism of a housing requires high accuracy, thereby increasing cost. Further, if the value of fr/f exceeds the upper limit defined by conditional expression (10), the amount of movements while focusing will increase and the entire system will increase in size, which is unfavorable.

$$0.5 < fr/f < 2.5 \quad (10)$$

$$0.8 < fr/f < 1.8 \quad (10\text{-}1), \text{where}$$

fr: the focal length of the second lens group.

In the present imaging lens, it is preferable for a glass in particular to be used for a material of the lens disposed on the most-object side. Alternatively, transparent ceramics may be employed.

Further, in the case that the present imaging lens is applied for use in environments in which lenses are easily damaged, it is preferable for a multi-layer film coating for protection to be applied onto lenses. Moreover, in addition to a coating for protection, an antireflection coating may be applied onto lenses so as to reduce ghost light, and the like when using the lenses.

In the example of FIG. 1, the optical member PP is disposed between the lens system and the image surface Sim. Instead of disposing a low-pass filter, various kinds of filters which cut specific wavelength ranges, and the like between the lens system and the image surface Sim, these various kinds of filters may be disposed between lenses, or a coating, which exhibits the same effects as the various kinds of filters, may be applied onto the lens surfaces of any of the lenses.

Next, Numerical Examples of the imaging lens of the present invention will be described. A cross-sectional view illustrating the lens configuration of the imaging lens in Example 1 is shown in FIG. 1, a cross-sectional view illustrating the lens configuration of the imaging lens in Example 2 is shown in FIG. 2, a cross-sectional view illustrating the lens configuration of the imaging lens in Example 3 is shown in FIG. 3, a cross-sectional view illustrating the lens configuration of the imaging lens in Example 4 is shown in FIG. 4, a cross-sectional view illustrating the lens configuration of the imaging lens in Example 5 is shown in FIG. 5, a cross-sectional view illustrating the lens configuration of the imaging lens in Example 6 is shown in FIG. 6, a cross-sectional view illustrating the lens configuration of the imaging lens in Example 7 is shown in FIG. 7, and a cross-sectional view illustrating the lens configuration of the imaging lens in Example 8 is shown in FIG. 8.

In FIG. 1 through FIG. 8, the optical member PP is shown as well. Further, the left side is the object side, and the right side is the image side. The aperture stop St and luminous flux control surface F shown in the Figures do not necessarily represent the sizes or shapes thereof, but the positions thereof on the optical axis Z.

The basic lens data of the imaging lens in Example 1 is shown in Table 1, data with respect to the distance between surfaces which move is shown in Table 2, and data with respect to specifications is shown in Table 3. Further, the basic lens data of the imaging lens in Example 2 is shown in Table 4, data with respect to the distance between surfaces which move is shown in Table 5, and data with respect to specifications is shown in Table 6. The basic lens data of the imaging lens in Example 3 is shown in Table 7, data with respect to the distance between surfaces which move is shown in Table 8, and data with respect to specifications is shown in Table 9. The basic lens data of the imaging lens in Example 4 is shown in Table 10, data with respect to the distance between surfaces which move is shown in Table 11, and data with respect to specifications is shown in Table 12. The basic lens data of the imaging lens in Example 5 is shown in Table 13, data with respect to the distance between surfaces which move is shown in Table 14, and data with respect to specifications is shown in Table 15. The basic lens data of the imaging lens in Example 6 is shown in Table 16, data with respect to the distance between surfaces which move is shown in Table 17, and data with respect to specifications is shown in Table 18. The basic lens data of the imaging lens in Example 7 is shown in Table 19, data with respect to the distance between surfaces which move is shown in Table 20, and data with respect to specifications is shown in Table 21. The basic lens data of the imaging lens in Example 8 is shown in Table 22, data with respect to the distance between surfaces which move is shown in Table 23, and data with respect to specifications is shown in Table 24.

The meanings of symbols in the Tables will be explained below with reference to Example 1 as an example. The same basically applies to Examples 2 through 8.

In the lens data of Example 1, column Si shows the i-th (i=1, 2, 3, . . . ) surface number, the value of i sequentially increasing from the surface of the constituent element at the most-object side, which is designated as 1, toward the image side. Column Ri shows the radius of curvature of the i-th surface. Column Di shows the distances between i-th surfaces and (i+1)st surfaces along the optical axis Z. Column of REi shows an aperture diameter (luminous flux control diameter) of the i-th surface. Column Ndj show the refractive index of a medium between a j-th (j=1, 2, 3, . . . ) surface and an (i+1)st surface with respect to the d-line (wavelength: 587.6 nm). Column νdj shows the Abbe number of the j-th optical element with respect to the d-line, the value of i sequentially increasing from the optical element at the most-object side, which is designated as 1, toward the image side.

The sign of the radius of curvature is positive in the case that a surface shape is convex on the object side, and negative in the case that the surface shape is convex on the image side. The basic lens data also shows an aperture stop St, an optical member PP, and an image surface. Further, the column of the surface number of a surface corresponding to the aperture stop St indicates a surface number and the word (Stop). Similarly, an asterisk mark * is attached to the surface number in the column of the surface number of a surface corresponding to the image surface. In the lens data of Table 1, the columns of the distances between surfaces, which vary during focusing, respectively represent do (n=1, 2).

The data with respect to distance between surfaces which move in Table 2 shows values of d1 and d2 at INF and at a shortest distance.

The data with respect to specifications in Table 3 shows values of focal length f′, a F number FNo., and a full angle view 2ω.

In the basic lens data, data with respect to the distance between the surfaces which move, and data with respect to specifications, degrees are used as the unit of angles and mm is used as the unit of length, but other appropriate units may also be used, as optical systems are usable even when they are proportionally enlarged or miniaturized.

TABLE 1

Example 1 Lens Data (n, ν: d-line)

| Si (Surface Number) | Ri (Radius of Curvature) | Di (Distance Between Surfaces) | REi (Aperture Diameter) | Ndi (Refractive Index) | ν dj (Abbe Number) |
|---|---|---|---|---|---|
| 1 | 2.45973 | 0.17797 | 0.00000 | 1.77250 | 49.60 |
| 2 | ∞ | 0.01285 | 0.00000 | | |
| 3 | 1.45911 | 0.05340 | 0.00000 | 1.48749 | 70.23 |
| 4 | 0.67242 | 0.31686 | 0.00000 | | |
| 5 | −2.05344 | 0.04272 | 0.00000 | 1.48749 | 70.23 |
| 6 | 1.12730 | 0.04930 | 0.00000 | | |
| 7 | 2.08154 | 0.04201 | 0.00000 | 1.49700 | 81.54 |
| 8 | 0.86093 | 0.23362 | 0.00000 | | |
| 9 | 1.39206 | 0.22035 | 0.00000 | 1.71299 | 53.87 |
| 10 | −1.49344 | 0.04043 | 0.00000 | 1.59551 | 39.24 |
| 11 | −3.39189 | 0.01142 | 0.00000 | | |
| 12 | 1.29707 | 0.51398 | 0.39405 | 1.71299 | 53.87 |
| 13 | −0.84547 | 0.03881 | 0.00000 | 1.60342 | 38.03 |
| 14 | 0.91039 | 0.17561 | 0.00000 | | |
| 15(Stop) | ∞ | d1 | 0.28912 | | |
| 16 | ∞ | 0.02570 | 0.29411 | | |
| 17 | −3.29669 | 0.07819 | 0.00000 | 1.71299 | 53.87 |
| 18 | −1.09596 | 0.05247 | 0.00000 | | |
| 19 | −0.57148 | 0.03616 | 0.00000 | 1.58144 | 40.75 |
| 20 | 2.07628 | 0.25556 | 0.00000 | 1.49700 | 81.54 |
| 21 | −0.70628 | 0.00714 | 0.00000 | | |
| 22 | −10.54116 | 0.07419 | 0.00000 | 1.59522 | 67.74 |
| 23 | −2.36613 | 0.00714 | 0.00000 | | |
| 24 | 1.54967 | 0.14214 | 0.00000 | 1.62041 | 60.29 |
| 25 | −7.75941 | d2 | 0.00000 | | |
| 26 | ∞ | 0.10851 | 0.00000 | 1.51680 | 64.20 |
| 27 | ∞ | 0.05714 | 0.00000 | | |
| 28(*) | ∞ | 0.00000 | 0.00000 | | |

TABLE 2

Example 1 Distance Data

| | INF | SHORTEST DISTANCE |
|---|---|---|
| d1 | 0.34041 | 0.19688 |
| d2 | 0.91259 | 1.05612 |

TABLE 3

Example 1 Specifications (d-line)

|  | INF |
|---|---|
| f | 1.00 |
| FNo. | 1.90 |
| 2ω[°] | 49.0 |

TABLE 4

Example 2 Lens Data (n, ν: d-line)

| Si (Surface Number) | Ri (Radius of Curvature) | Di (Distance Between Surfaces) | REi (Aperture Diameter) | Ndi (Refractive Index) | ν dj (Abbe Number) |
|---|---|---|---|---|---|
| 1 | 7.82347 | 0.12209 | 0.00000 | 1.77250 | 49.60 |
| 2 | −7.82347 | 0.01285 | 0.00000 |  |  |
| 3 | 1.20219 | 0.05226 | 0.00000 | 1.51633 | 64.14 |
| 4 | 0.66534 | 0.39170 | 0.00000 |  |  |
| 5 | −1.22560 | 0.04569 | 0.00000 | 1.48749 | 70.23 |
| 6 | 1.13478 | 0.06174 | 0.00000 |  |  |
| 7 | 2.19540 | 0.04369 | 0.00000 | 1.51633 | 64.14 |
| 8 | 1.33354 | 0.11707 | 0.00000 |  |  |
| 9 | 2.14443 | 0.27612 | 0.00000 | 1.75500 | 52.32 |
| 10 | −1.20026 | 0.05353 | 0.00000 | 1.64769 | 33.79 |
| 11 | −1.93764 | 0.08468 | 0.00000 |  |  |
| 12 | ∞ | 0.05712 | 0.38696 |  |  |
| 13 | 0.91998 | 0.23770 | 0.00000 | 1.77250 | 49.60 |
| 14 | −1.30122 | 0.03570 | 0.00000 | 1.59551 | 39.24 |
| 15 | 0.73959 | 0.17563 | 0.00000 |  |  |
| 16(Stop) | ∞ | d1 | 0.32056 |  |  |
| 17 | −10.56900 | 0.08031 | 0.00000 | 1.71299 | 53.87 |
| 18 | −1.33281 | 0.06420 | 0.00000 |  |  |
| 19 | −0.63634 | 0.12693 | 0.29986 | 1.59551 | 39.24 |
| 20 | 1.52631 | 0.23100 | 0.00000 | 1.49700 | 81.54 |
| 21 | −1.00374 | 0.00571 | 0.00000 |  |  |
| 22 | −5.24961 | 0.11009 | 0.00000 | 1.59522 | 67.74 |
| 23 | −1.26272 | 0.00572 | 0.00000 |  |  |
| 24 | 5.49335 | 0.04535 | 0.00000 | 1.59551 | 39.24 |
| 25 | 1.67439 | 0.14090 | 0.00000 | 1.75500 | 52.32 |
| 26 | −5.47690 | d2 | 0.00000 |  |  |
| 27 | ∞ | 0.10852 | 0.00000 | 1.51680 | 64.20 |
| 28 | ∞ | 0.05711 | 0.00000 |  |  |
| 29(*) | ∞ | 0.00000 | 0.00000 |  |  |

TABLE 5

Example 2 Distance Data

|  | INF | SHORTEST DISTANCE |
|---|---|---|
| d1 | 0.39786 | 0.24977 |
| d2 | 0.88700 | 1.03509 |

TABLE 6

Example 2 Specifications (d-line)

|  | INF |
|---|---|
| f | 1.52 |
| FNo. | 1.90 |
| 2ω[°] | 49.6 |

TABLE 7

Example 3 Lens Data (n, ν: d-line)

| Si (Surface Number) | Ri (Radius of Curvature) | Di (Distance Between Surfaces) | REi (Aperture Diameter) | Ndi (Refractive Index) | ν dj (Abbe Number) |
|---|---|---|---|---|---|
| 1 | 3.75768 | 0.13460 | 0.00000 | 1.77250 | 49.60 |
| 2 | −40.61331 | 0.01285 | 0.00000 | | |
| 3 | 1.31776 | 0.05048 | 0.00000 | 1.48749 | 70.23 |
| 4 | 0.72064 | 0.31179 | 0.00000 | | |
| 5 | −2.42943 | 0.04569 | 0.00000 | 1.48749 | 70.23 |
| 6 | 0.97315 | 0.34902 | 0.00000 | | |
| 7 | 1.66074 | 0.03684 | 0.00000 | 1.48749 | 70.23 |
| 8 | 0.98941 | 0.08568 | 0.00000 | | |
| 9 | 1.54727 | 0.18461 | 0.00000 | 1.75500 | 52.32 |
| 10 | −1.81422 | 0.03683 | 0.00000 | 1.64769 | 33.79 |
| 11 | −4.14195 | 0.15122 | 0.00000 | | |
| 12 | ∞ | 0.00000 | 0.39982 | | |
| 13 | 0.88986 | 0.25316 | 0.00000 | 1.77250 | 49.60 |
| 14 | −1.26816 | 0.02864 | 0.00000 | 1.59551 | 39.24 |
| 15 | 0.66234 | 0.17563 | 0.00000 | | |
| 16(Stop) | ∞ | d1 | 0.31300 | | |
| 17 | ∞ | 0.02570 | 0.29701 | | |
| 18 | −2.25908 | 0.06111 | 0.00000 | 1.71299 | 53.87 |
| 19 | −1.14571 | 0.07058 | 0.00000 | | |
| 20 | −0.59691 | 0.03815 | 0.00000 | 1.59551 | 39.24 |
| 21 | 1.74528 | 0.25294 | 0.00000 | 1.49700 | 81.54 |
| 22 | −0.85527 | 0.00857 | 0.00000 | | |
| 23 | −25.65481 | 0.11486 | 0.00000 | 1.61800 | 63.33 |
| 24 | −1.44031 | 0.00857 | 0.00000 | | |
| 25 | 2.28528 | 0.04501 | 0.00000 | 1.58144 | 40.75 |
| 26 | 1.37753 | 0.15821 | 0.00000 | 1.60311 | 60.64 |
| 27 | −6.23706 | d2 | 0.00000 | | |
| 28 | ∞ | 0.10852 | 0.00000 | 1.51680 | 64.20 |
| 29 | ∞ | 0.05711 | 0.00000 | | |
| 30(*) | ∞ | 0.00000 | 0.00000 | | |

TABLE 8

Example 3 Distance Data

| | INF | SHORTEST DISTANCE |
|---|---|---|
| d1 | 0.34418 | 0.19690 |
| d2 | 0.87688 | 1.02416 |

TABLE 9

Example 3 Specifications (d-line)

| | INF |
|---|---|
| f | 1.52 |
| FNo. | 1.90 |
| 2ω[°] | 49.2 |

TABLE 10

Example 4 Lens Data (n, ν: d-line)

| Si (Surface Number) | Ri (Radius of Curvature) | Di (Distance Between Surfaces) | REi (Aperture Diameter) | Ndi (Refractive Index) | ν dj (Abbe Number) |
|---|---|---|---|---|---|
| 1 | 5.63366 | 0.11181 | 0.00000 | 1.77250 | 49.60 |
| 2 | −20.71973 | 0.01285 | 0.00000 | | |
| 3 | 1.18288 | 0.05226 | 0.00000 | 1.51633 | 64.14 |
| 4 | 0.69925 | 0.34507 | 0.00000 | | |
| 5 | −2.11102 | 0.04569 | 0.00000 | 1.48749 | 70.23 |
| 6 | 1.08753 | 0.08186 | 0.00000 | | |
| 7 | 1.97066 | 0.04000 | 0.00000 | 1.51633 | 64.14 |
| 8 | 1.16296 | 0.09734 | 0.00000 | | |
| 9 | 2.34112 | 0.38011 | 0.00000 | 1.75500 | 52.32 |
| 10 | −2.31413 | 0.11942 | 0.00000 | | |
| 11 | ∞ | 0.05711 | 0.38693 | | |
| 12 | 0.89782 | 0.23604 | 0.00000 | 1.77250 | 49.60 |
| 13 | −1.17200 | 0.03608 | 0.00000 | 1.59551 | 39.24 |
| 14 | 0.74388 | 0.18409 | 0.00000 | | |
| 15(Stop) | ∞ | d1 | 0.31090 | | |
| 16 | −4.65863 | 0.07211 | 0.00000 | 1.71299 | 53.87 |
| 17 | −1.21902 | 0.07080 | 0.00000 | | |
| 18 | −0.57366 | 0.03897 | 0.29984 | 1.59551 | 39.24 |
| 19 | 1.67253 | 0.31349 | 0.00000 | 1.49700 | 81.54 |
| 20 | −0.74806 | 0.00571 | 0.00000 | | |
| 21 | 59.26118 | 0.09571 | 0.00000 | 1.61800 | 63.33 |
| 22 | −2.01957 | 0.00571 | 0.00000 | | |
| 23 | 5.53018 | 0.04504 | 0.00000 | 1.59551 | 39.24 |
| 24 | 1.61864 | 0.14037 | 0.00000 | 1.75500 | 52.32 |
| 25 | −6.41850 | d2 | 0.00000 | | |
| 26 | ∞ | 0.10851 | 0.00000 | 1.51680 | 64.20 |
| 27 | ∞ | 0.05713 | 0.00000 | | |
| 28(*) | ∞ | 0.00000 | 0.00000 | | |

TABLE 11

Example 4 Distance Data

|  | INF | SHORTEST DISTANCE |
|---|---|---|
| d1 | 0.38200 | 0.23529 |
| d2 | 0.89209 | 1.03880 |

TABLE 12

Example 4 Specifications (d-line)

|  | INF |
|---|---|
| f | 1.00 |
| FNo. | 1.90 |
| 2ω [°] | 49.4 |

TABLE 13

Example 5 Lens Data (n, ν: d-line)

| Si (Surface Number) | Ri (Radius of Curvature) | Di (Distance Between Surfaces) | REi (Aperture Diameter) | Ndi (Refractive Index) | ν dj (Abbe Number) |
|---|---|---|---|---|---|
| 1 | 86.82910 | 0.15374 | 0.00000 | 1.77250 | 49.60 |
| 2 | −4.12152 | 0.01287 | 0.00000 |  |  |
| 3 | 1.12176 | 0.05233 | 0.00000 | 1.51633 | 64.14 |
| 4 | 0.68812 | 0.34196 | 0.00000 |  |  |
| 5 | −1.16157 | 0.04576 | 0.00000 | 1.48749 | 70.23 |
| 6 | 0.94298 | 0.20508 | 0.00000 |  |  |
| 7 | 2.84005 | 0.36665 | 0.00000 | 1.75500 | 52.32 |
| 8 | −1.33880 | 0.04375 | 0.00000 | 1.64769 | 33.79 |
| 9 | −2.06414 | 0.01145 | 0.00000 |  |  |
| 10 | ∞ | 0.05719 | 0.38748 |  |  |
| 11 | 0.93090 | 0.26146 | 0.00000 | 1.77250 | 49.60 |
| 12 | −1.28012 | 0.03615 | 0.00000 | 1.59551 | 39.24 |
| 13 | 0.75149 | 0.18420 | 0.00000 |  |  |
| 14(Stop) | ∞ | d1 | 0.31585 |  |  |
| 15 | −13.85540 | 0.07213 | 0.00000 | 1.71299 | 53.87 |
| 16 | −1.46093 | 0.06815 | 0.00000 |  |  |
| 17 | −0.63339 | 0.15717 | 0.30026 | 1.59551 | 39.24 |
| 18 | 1.64561 | 0.22973 | 0.00000 | 1.49700 | 81.54 |
| 19 | −0.86630 | 0.00572 | 0.00000 |  |  |
| 20 | −27.56004 | 0.09885 | 0.00000 | 1.61800 | 63.33 |
| 21 | −1.76036 | 0.00572 | 0.00000 |  |  |
| 22 | 5.49136 | 0.04498 | 0.00000 | 1.59551 | 39.24 |
| 23 | 1.63089 | 0.13978 | 0.00000 | 1.75500 | 52.32 |
| 24 | −6.46275 | d2 | 0.00000 |  |  |
| 25 | ∞ | 0.10867 | 0.00000 | 1.51680 | 64.20 |
| 26 | ∞ | 0.05719 | 0.00000 |  |  |
| 27(*) | ∞ | 0.00000 | 0.00000 |  |  |

TABLE 14

Example 5 Distance Data

|  | INF | SHORTEST DISTANCE |
|---|---|---|
| d1 | 0.38546 | 0.23779 |
| d2 | 0.88660 | 1.03472 |

TABLE 15

Example 5 Specifications (d-line)

|  | INF |
|---|---|
| f | 1.00 |
| FNo. | 1.90 |
| 2ω [°] | 49.6 |

TABLE 16

Example 6 Lens Data (n, ν: d-line)

| Si (Surface Number) | Ri (Radius of Curvature) | Di (Distance Between Surfaces) | REi (Aperture Diameter) | Ndi (Refractive Index) | ν dj (Abbe Number) |
|---|---|---|---|---|---|
| 1 | 2.47975 | 0.17889 | 0.00000 | 1.77250 | 49.60 |
| 2 | −903.92220 | 0.01285 | 0.00000 |  |  |
| 3 | 1.49299 | 0.05405 | 0.00000 | 1.48749 | 70.23 |
| 4 | 0.67809 | 0.30747 | 0.00000 |  |  |
| 5 | −2.09364 | 0.04216 | 0.00000 | 1.51680 | 64.20 |
| 6 | 0.97618 | 0.07918 | 0.00000 |  |  |
| 7 | 2.87267 | 0.04347 | 0.00000 | 1.48749 | 70.23 |
| 8 | 1.18051 | 0.25025 | 0.00000 |  |  |
| 9 | 1.67010 | 0.20825 | 0.00000 | 1.71300 | 53.94 |
| 10 | −1.50799 | 0.04328 | 0.00000 | 1.58144 | 40.75 |
| 11 | −2.72562 | 0.01142 | 0.00000 |  |  |
| 12 | 0.96764 | 0.50384 | 0.39692 | 1.71300 | 53.94 |
| 13 | −2.07551 | 0.03998 | 0.00000 | 1.63980 | 34.46 |
| 14 | 0.70133 | 0.17847 | 0.00000 |  |  |
| 15(Stop) | ∞ | d1 | 0.28984 |  |  |
| 16 | ∞ | 0.02284 | 0.30554 |  |  |
| 17 | −3.17810 | 0.06557 | 0.00000 | 1.49700 | 81.54 |
| 18 | −1.25502 | 0.00857 | 0.00000 |  |  |
| 19 | −9.02841 | 0.08430 | 0.00000 | 1.71300 | 53.94 |
| 20 | −1.34489 | 0.06856 | 0.00000 |  |  |
| 21 | −0.60307 | 0.03801 | 0.00000 | 1.58144 | 40.75 |
| 22 | 4.13388 | 0.24465 | 0.00000 | 1.49700 | 81.54 |
| 23 | −0.69291 | 0.00857 | 0.00000 |  |  |
| 24 | 1.71778 | 0.13961 | 0.00000 | 1.61800 | 63.33 |
| 25 | −5.72757 | d2 | 0.00000 |  |  |
| 26 | ∞ | 0.10851 | 0.00000 | 1.51680 | 64.20 |
| 27 | ∞ | 0.05711 | 0.00000 |  |  |
| 28(*) | ∞ | 0.00000 | 0.00000 |  |  |

TABLE 17

Example 6 Distance Data

|  | INF | SHORTEST DISTANCE |
|---|---|---|
| d1 | 0.35351 | 0.20680 |
| d2 | 0.87677 | 1.02348 |

TABLE 18

Example 6 Specifications (d-line)

|  | INF |
|---|---|
| f | 1.52 |
| FNo. | 1.90 |
| 2ω [°] | 49.4 |

TABLE 19

Example 7 Lens Data (n, ν: d-line)

| Si (Surface Number) | Ri (Radius of Curvature) | Di (Distance Between Surfaces) | REi (Aperture Diameter) | Ndi (Refractive Index) | ν dj (Abbe Number) |
|---|---|---|---|---|---|
| 1 | 8.29900 | 0.06400 | 0.00000 | 1.77250 | 49.60 |
| 2 | −8.29900 | 0.00925 | 0.00000 | | |
| 3 | 0.82119 | 0.03809 | 0.00000 | 1.51633 | 64.14 |
| 4 | 0.57927 | 0.23743 | 0.00000 | | |
| 5 | −1.11937 | 0.03449 | 0.00000 | 1.48749 | 70.23 |
| 6 | 1.12484 | 0.03569 | 0.00000 | | |
| 7 | 1.81676 | 0.03445 | 0.00000 | 1.51633 | 64.14 |
| 8 | 1.03136 | 0.09916 | 0.00000 | | |
| 9 | 1.61211 | 0.17356 | 0.00000 | 1.75500 | 52.32 |
| 10 | −0.72673 | 0.03249 | 0.00000 | 1.64769 | 33.79 |
| 11 | −1.83050 | 0.01877 | 0.00000 | | |
| 12 | ∞ | 0.00998 | 0.33035 | | |
| 13 | 0.69683 | 0.28584 | 0.00000 | 1.77250 | 49.60 |
| 14 | −1.53480 | 0.08958 | 0.00000 | 1.59551 | 39.24 |
| 15 | 0.49135 | 0.12310 | 0.00000 | | |
| 16(Stop) | ∞ | d1 | 0.23404 | | |
| 17 | −5.29102 | 0.03816 | 0.00000 | 1.71299 | 53.87 |
| 18 | −1.51160 | 0.05794 | 0.00000 | | |
| 19 | −0.43931 | 0.03959 | 0.21557 | 1.59551 | 39.24 |
| 20 | 4.29677 | 0.15243 | 0.00000 | 1.49700 | 81.54 |
| 21 | −0.57738 | 0.00400 | 0.00000 | | |
| 22 | −3.60668 | 0.07350 | 0.00000 | 1.59522 | 67.74 |
| 23 | −0.92546 | 0.00412 | 0.00000 | | |
| 24 | 3.76736 | 0.03182 | 0.00000 | 1.59551 | 39.24 |
| 25 | 1.00115 | 0.10494 | 0.00000 | 1.75500 | 52.32 |
| 26 | −5.39084 | d2 | 0.00000 | | |
| 27 | ∞ | 0.09880 | 0.00000 | 1.51680 | 64.20 |
| 28 | ∞ | 0.03993 | 0.00000 | | |
| 29(*) | ∞ | 0.00000 | 0.00000 | | |

TABLE 20

Example 7 Distance Data

| | INF | SHORTEST DISTANCE |
|---|---|---|
| d1 | 0.27178 | 0.16079 |
| d2 | 0.60187 | 0.71286 |

TABLE 21

Example 7 Specifications (d-line)

| | INF |
|---|---|
| f | 1.52 |
| FNo. | 1.90 |
| 2ω [°] | 36.8 |

TABLE 22

Example 8 Lens Data (n, ν: d-line)

| Si (Surface Number) | Ri (Radius of Curvature) | Di (Distance Between Surfaces) | REi (Aperture Diameter) | Ndi (Refractive Index) | ν dj (Abbe Number) |
|---|---|---|---|---|---|
| 1 | 3.96444 | 0.10840 | 0.00000 | 1.77250 | 49.60 |
| 2 | −3.96444 | 0.00916 | 0.00000 | | |
| 3 | 1.05829 | 0.07426 | 0.00000 | 1.51633 | 64.14 |
| 4 | 0.61932 | 0.21620 | 0.00000 | | |
| 5 | −0.98827 | 0.03239 | 0.00000 | 1.51633 | 64.14 |
| 6 | 0.82374 | 0.13117 | 0.00000 | | |
| 7 | 3.47220 | 0.23003 | 0.00000 | 1.77250 | 49.60 |
| 8 | −0.48018 | 0.03269 | 0.00000 | 1.72047 | 34.71 |
| 9 | −1.76214 | 0.00638 | 0.00000 | | |
| 10 | ∞ | 0.00187 | 0.31286 | | |
| 11 | 0.59090 | 0.27661 | 0.00000 | 1.80400 | 46.58 |
| 12 | 2.48519 | 0.06430 | 0.00000 | 1.67300 | 38.15 |
| 13 | 0.50638 | 0.17457 | 0.00000 | | |
| 14(Stop) | ∞ | d1 | 0.22970 | | |
| 15 | −20.34951 | 0.04971 | 0.00000 | 1.75500 | 52.32 |
| 16 | −1.31520 | 0.06640 | 0.00000 | | |
| 17 | −0.43128 | 0.05185 | 0.21490 | 1.59551 | 39.24 |
| 18 | 7.25317 | 0.12526 | 0.00000 | 1.49700 | 81.54 |
| 19 | −0.57728 | 0.00417 | 0.00000 | | |
| 20 | −3.62464 | 0.09119 | 0.00000 | 1.59522 | 67.74 |
| 21 | −0.95142 | 0.00592 | 0.00000 | | |
| 22 | 4.00138 | 0.03549 | 0.00000 | 1.67300 | 38.15 |
| 23 | 0.94623 | 0.11662 | 0.00000 | 1.77250 | 49.60 |
| 24 | −4.01703 | d2 | 0.00000 | | |
| 25 | ∞ | 0.09196 | 0.00000 | 1.51680 | 64.20 |
| 26 | ∞ | 0.03997 | 0.00000 | | |
| 27(*) | ∞ | 0.00000 | 0.00000 | | |

TABLE 23

Example 8 Distance Data

| | INF | SHORTEST DISTANCE |
|---|---|---|
| d1 | 0.23925 | 0.13533 |
| d2 | 0.62324 | 0.72716 |

TABLE 24

Example 8 Specifications (d-line)

| | INF |
|---|---|
| f | 1.00 |
| FNo. | 1.90 |
| 2ω [°] | 36.4 |

Values corresponding to conditional expressions (1) through (10) of the imaging lens of Examples 1 through 8 are shown in Table 25. Note that the d-line is a reference wavelength in all the Examples, and the values shown in Table 25 below are based on the reference wavelength.

TABLE 25

| Numbers of Expressions | Conditional Expression | Example 1 | Example 2 | Example 3 | Example 4 | Example 5 | Example 6 | Example 7 | Example 8 |
|---|---|---|---|---|---|---|---|---|---|
| (1) | f1a/f | 3.184 | 5.081 | 4.458 | 5.744 | 5.097 | 3.202 | 5.381 | 2.581 |
| (2) | ra/rb | −0.327 | −0.543 | −0.297 | −0.331 | −0.592 | −0.324 | −0.517 | −0.627 |
| (3) | Ds/f | 0.317 | 0.392 | 0.312 | 0.345 | 0.342 | 0.307 | 0.237 | 0.216 |
| (4) | Σ ν m/2 | 70.2 | 67.2 | 70.2 | 67.2 | 67.2 | 67.2 | 67.2 | 64.1 |
| (5) | (rc − rd)/(rc + rd) | 0.175 | 0.109 | 0.147 | 0.094 | 0.107 | 0.160 | 0.173 | 0.077 |
| (6) | f2a/f | 2.269 | 2.131 | 3.188 | 2.296 | 2.285 | 4.126 | 2.956 | 1.860 |
| (7) | Σ ν ip/np | 65.9 | 63.9 | 64.9 | 62.8 | 62.8 | 70.1 | 63.9 | 62.8 |
| (8) | rp/rq | −0.200 | −0.306 | −0.221 | −0.252 | −0.252 | −0.300 | −0.186 | −0.236 |
| (9) | |ff/f| | 12.679 | 4.426 | 4.034 | 4.759 | 4.693 | −88.579 | 2.735 | 4.772 |
| (10) | fr/f | 1.105 | 1.274 | 1.261 | 1.229 | 1.252 | 1.081 | 1.020 | 0.934 |

A through H of FIG. 9 respectively shows aberrations of the imaging lens in Example 1. A through D of FIG. 9 respectively show spherical aberration, astigmatism, distortion, and lateral chromatic aberration at INF. E through H of FIG. 9 respectively show spherical aberration, astigmatism, distortion, and lateral chromatic aberration at a shortest distance.

Each of aberration diagrams illustrating spherical aberration, astigmatism, and distortion shows an aberration based on the d-line (wavelength: 587.6 nm) as the reference wavelength. The spherical aberration diagrams and lateral chromatic aberration diagrams illustrate aberrations with respect to the d-line (wavelength: 587.6 nm), the C-line (wavelength: 656.3 nm), the F-line (wavelength: 486.1 nm), and the g-line (wavelength: 435.8 nm) by the solid lines, long broken lines, short broken lines, and gray lines, respectively. In the astigmatism diagrams, the solid line illustrates astigmatism in the sagittal direction while the broken line illustrates astigmatism in the tangential direction. FNo. in the spherical aberration diagrams refers to a F number, and ω in the other aberration diagrams refers to a half angle of view.

FIG. 10 shows lateral aberration diagrams at INF and at a shortest distance of the imaging lens in Example 1.

In the lateral aberration diagrams, aberrations with respect to the d-line (wavelength: 587.6 nm), the C-line (wavelength: 656.3 nm), the F-line (wavelength: 486.1 nm), and the g-line (wavelength: 435.8 nm) are represented by the solid lines, long broken lines, short broken lines, and gray lines, respectively.

Similarly, A through H of FIG. 11 respectively illustrate aberration diagrams and FIG. 12 illustrates lateral aberrations at INF and at a shortest distance of the imaging lens of Example 2. A through H of FIG. 13 respectively illustrate aberration diagrams and FIG. 14 illustrates lateral aberrations at INF and at a shortest distance of the imaging lens of Example 3. A through H of FIG. 15 respectively illustrate aberration diagrams and FIG. 16 illustrates lateral aberrations at INF and at a shortest distance of the imaging lens of Example 4. A through H of FIG. 17 respectively illustrate aberration diagrams and FIG. 18 illustrates lateral aberrations at INF and at a shortest distance of the imaging lens of Example 5. A through H of FIG. 19 respectively illustrate aberration diagrams and FIG. 20 illustrates lateral aberrations at INF and at a shortest distance of the imaging lens of Example 6. A through H of FIG. 21 respectively illustrate aberration diagrams and FIG. 22 illustrates lateral aberrations at INF and at a shortest distance of the imaging lens of Example 7. A through H of FIG. 23 respectively illustrate aberration diagrams and FIG. 24 illustrates lateral aberrations at INF and at a shortest distance of the imaging lens of Example 8.

As can be seen from the aforementioned data, each of the imaging lenses of Examples 1 through 5, 7, and 8 is an imaging lens having a fast F number of approximately 2 and high performance, in which field curvature is corrected from the center of an image height to a peripheral portion, distortion is minimal, and chromatic aberration is satisfactorily corrected in order to achieve higher resolution.

It can be seen that the imaging lens in Example 6 satisfies all the conditional expressions other than conditional expression (9) and has sufficiently high performance as well.

All the imaging lenses of Examples 1 through 8, which include no aspherical surfaces, are advantageous from the viewpoint of cost.

Next, an imaging apparatus according to the embodiment of the present invention will be described. FIG. 25 illustrate a schematic configuration of an imaging apparatus to which the imaging lens of the embodiment of the present invention is applied as an example of the imaging apparatus of the embodiment of the present invention. The examples of the imaging apparatus can include video cameras, electronic still cameras, and the like in which solid imaging elements such as a CCD (Charge Coupled Device), a CMOS (Complementary Metal Oxide Semiconductor), and the like are applied as a recording medium, for example.

The imaging apparatus 10 shown in FIG. 25 is equipped with an imaging lens 1, a filter 2 disposed on the image side of the imaging lens 1, an imaging element 3 which captures images of a subject to be formed by the imaging lens 1, a signal processing section 4 which calculates and processes output signals from the imaging element 3, and a focus control section 5 which performs focus adjustment of the imaging lens 1.

The imaging lens 1 consists of a first lens group G1 which is fixed while focusing, an aperture stop St, and a second lens group G2 which moves while focusing.

FIG. 25 schematically shows each lens group. The imaging element 3 converts optical images formed by the imaging lens 1 into an electric signal and is disposed such that the imaging surface thereof matches the image surface of the imaging lens. A CCD, a CMOS, or the like may be employed as the imaging element 3, for example.

The present invention has been described with reference to the Embodiments and Examples. The present invention is not limited to the embodiments and the examples described above, and various modifications are possible. For example, values, such as the radius of curvature, the distances between surfaces, the refractive indices, the Abbe numbers, aspherical surface coefficients of each lens element, and the like are not limited to the values in the numerical examples shown in the Tables, but may be other values.

What is claimed is:

1. An imaging lens substantially consisting of a first lens group, a stop, and a second lens group in this order from the object side, the imaging lens performing focusing at each object distance by moving the second lens group along the optical axis;

the first lens group includes at least a positive lens disposed on the most-object side, a negative meniscus lens with a convex surface toward the object side, a biconcave negative lens, and a cemented lens substantially constituted by two lenses, which are a positive lens and a negative lens, in this order from the object side;

the second lens group includes at least a first positive lens with a convex surface toward the image side, which is disposed on the most-object side, a cemented lens substantially constituted by two lenses, which are a positive lens and a negative lens, and a second positive lens with a convex surface toward the image side, in this order from the object side; and conditional expression below is satisfied:

$$2.0 < f1a/f < 8.0 \quad (1),$$ where f1a: the focal length of the positive lens disposed on the most-object side in the first lens group, and
f: the focal length of the entire system at an object at infinity.

2. The imaging lens of claim 1, wherein conditional expression below is satisfied:

$$2.3 < f1a/f < 6.5 \quad (1\text{-}1).$$

3. The imaging lens of claim 1, wherein the negative meniscus lens and the biconcave negative lens are arranged adjacent to each other in the first lens group and conditional expressions below are satisfied:

$$-1.0 < ra/rb < -0.1 \quad (2)$$

$$0.1 < Ds/f < 0.6 \quad (3),$$ where ra: the radius of curvature of the image-side surface of the negative meniscus lens,
rb: the radius of curvature of the object-side surface of the biconcave negative lens, and
Ds: the distance between the image-side surface of the negative meniscus lens and the object-side surface of the biconcave negative lens along the optical axis.

4. The imaging lens of claim 3, wherein conditional expressions below are satisfied:

$$-0.75 < ra/rb < -0.2 \quad (2\text{-}1)$$

$$0.18 < Ds/f < 0.45 \quad (3\text{-}1).$$

5. The imaging lens of claim 1, wherein conditional expression below is satisfied:

$$50 < \Sigma vm/2 \quad (4),$$ where

Σvm: the sum of the Abbe numbers of the negative meniscus lens and the biconcave negative lens in the first lens group.

6. The imaging lens of claim 5, wherein conditional expression below is satisfied:

$$60 < \Sigma vm/2 \quad (4\text{-}1).$$

7. The imaging lens of claim 1, wherein a cemented lens substantially constituted by two lenses, which are a positive lens and a negative lens in this order from the object side, is arranged on the most-image side of the first lens group and conditional expression below is satisfied:

$$-0.3 < (rc-rd)/(rc+rd) < 0.5 \quad (5),$$ where rc: the radius of curvature of the object-side surface of the cemented lens, and
rd: the radius of curvature of the image-side surface of the cemented lens.

8. The imaging lens of claim 7, wherein conditional expression below is satisfied:

$$0.0 \leq (rc-rd)/(rc+rd) < 0.5 \quad (5\text{-}1).$$

9. The imaging lens of claim 8, wherein conditional expression below is satisfied:

$$0.1 < (rc-rd)/(rc+rd) < 0.3 \quad (5\text{-}2).$$

10. The imaging lens of claim 1, wherein conditional expression below is satisfied:

$$1.0 < f2a/f < 8.0 \quad (6),$$ where f2a: the focal length of the positive lens disposed at the most-object side in the second lens group.

11. The imaging lens of claim 10, conditional expression below is satisfied:

$$1.0 < f2a/f < 5.0 \quad (6\text{-}1).$$

12. The imaging lens of claim 1, wherein conditional expression below is satisfied:

$$55 < \Sigma vip/np \quad (7),$$ where

Σvip: the sum of the Abbe numbers of all the positive lenses within the second lens group, and
np: the number of all the positive lenses within the second lens group.

13. The imaging lens of claim 1, wherein a lens on the most-image side in the second lens group is a positive lens and conditional expression below is satisfied:

$$-0.7 < rp/rq < 0.5 \quad (8),$$ where rp: the radius of curvature of the object-side surface of the positive lens at the most-image side in the second lens group, and
rq: the radius of curvature of the image-side surface of the positive lens at the most-image side in the second lens group.

14. The imaging lens of claim 1, wherein the most-image-side lens in the second lens group is a cemented lens substantially constituted by two lenses, which are a negative lens and a positive lens in this order from the object side.

15. The imaging lens of claim 1, wherein the first lens group has two cemented lenses, each of which is substantially constituted by two lenses, which are a positive lens and a negative lens, on the image side of the biconcave negative lens.

16. The imaging lens of claim 1, wherein each of the cemented lenses in the first lens group is substantially constituted by two lenses, which are a positive lens and a negative lens in this order from the object side, and a joint surface of at least one cemented lens is of a concave shape on the object side.

17. The imaging lens of claim 1, wherein the second lens group has two cemented lenses, each of which is substantially constituted by two lenses which are a positive lens and a negative lens.

18. The imaging lens of claim 1, wherein conditional expression below is satisfied:

$$2.0 < |ff/f| \quad (9),$$ where ff: the focal length of the first lens group.

19. The imaging lens of claim 1, wherein conditional expression below is satisfied:

$$0.5 < fr/f < 2.5 \quad (10),$$ where fr: the focal length of the second lens group.

20. An imaging apparatus comprising:
the imaging lens of claim 1.

* * * * *